United States Patent
Kutila et al.

(10) Patent No.: US 10,921,810 B2
(45) Date of Patent: Feb. 16, 2021

(54) SYSTEM AND METHOD FOR OPTIMIZING AUTONOMOUS VEHICLE CAPABILITIES IN ROUTE PLANNING

(71) Applicant: PCMS Holdings, Inc., Wilmington, DE (US)

(72) Inventors: Matti Kutila, Tampere (FI); Mikko Tarkiainen, Tampere (FI); Pertti Peussa, Tampere (FI); Ari Virtanen, Lempäälä (FI); Samian Kaur, Plymouth Meeting, PA (US)

(73) Assignee: PCMS Holdings, Inc., Wilmington, DE (US)

( * ) Notice: Subject to any disclaimer, the term of this patent is extended or adjusted under 35 U.S.C. 154(b) by 187 days.

(21) Appl. No.: 16/317,797

(22) PCT Filed: Jul. 26, 2017

(86) PCT No.: PCT/US2017/043947
§ 371 (c)(1),
(2) Date: Jan. 14, 2019

(87) PCT Pub. No.: WO2018/026603
PCT Pub. Date: Feb. 8, 2018

(65) Prior Publication Data
US 2019/0294167 A1    Sep. 26, 2019

Related U.S. Application Data
(60) Provisional application No. 62/370,064, filed on Aug. 2, 2016.

(51) Int. Cl.
*G05D 1/02* (2020.01)
*B60W 30/12* (2020.01)
(Continued)

(52) U.S. Cl.
CPC .......... *G05D 1/0212* (2013.01); *B60W 30/00* (2013.01); *B60W 30/12* (2013.01);
(Continued)

(58) Field of Classification Search
CPC .... G05D 1/0212; G05D 1/024; G05D 1/0246; G05D 1/0231; G05D 1/0257;
(Continued)

(56) References Cited

U.S. PATENT DOCUMENTS

| 4,931,767 A | 6/1990 | Albrecht |
| 5,504,577 A | 4/1996 | Loennqvist |

(Continued)

FOREIGN PATENT DOCUMENTS

| CN | 105318884 A | 2/2016 |
| CN | 105446338 A | 3/2016 |

(Continued)

OTHER PUBLICATIONS

Lioris, J., et. al., "Platoons of Connected Vehicles Can Double Throughput in Urban Roads". Arxiv.org, arXiv:1511.00775v1, available at: https://arxiv.org/abs/1511.00775v1, Nov. 3, 2015, pp. 1-17.

(Continued)

*Primary Examiner* — Michael J Zanelli
(74) *Attorney, Agent, or Firm* — Invention Mine LLC

(57) ABSTRACT

Systems and methods described herein determine an optimal lane trajectory and route for an autonomous vehicle under changing road conditions and forecast autonomous car performance along a route. A road's profile is analyzed to determine a safe lateral lane position. In ice or snow, a vehicle may follow ruts made by previous vehicles, even if following such ruts does not place a vehicle in a lane's center. In warmer weather, a vehicle may drive outside the ruts to avoid risks of aquaplaning. Dynamic road conditions and AV support along a route are used to maximize AV use (Continued)

and to forecast AV performance. A vehicle control system calculates sensor limitations and uses these sensor limitations when calculating which route to select.

15 Claims, 27 Drawing Sheets

(51) Int. Cl.

| | | |
|---|---|---|
| *B60W 30/18* | (2012.01) | |
| *G01C 21/34* | (2006.01) | |
| *G08G 1/0968* | (2006.01) | |
| *G06Q 10/04* | (2012.01) | |
| *B60W 30/00* | (2006.01) | |
| *G08G 1/0967* | (2006.01) | |
| *G08G 1/01* | (2006.01) | |
| *G08G 1/09* | (2006.01) | |
| *G07C 5/00* | (2006.01) | |
| *G08G 1/048* | (2006.01) | |

(52) U.S. Cl.
CPC ... *B60W 30/18163* (2013.01); *G01C 21/3461* (2013.01); *G05D 1/024* (2013.01); *G05D 1/0231* (2013.01); *G05D 1/0246* (2013.01); *G05D 1/0257* (2013.01); *G05D 1/0278* (2013.01); *G06Q 10/04* (2013.01); *G07C 5/008* (2013.01); *G08G 1/0116* (2013.01); *G08G 1/0129* (2013.01); *G08G 1/048* (2013.01); *G08G 1/091* (2013.01); *G08G 1/096725* (2013.01); *G08G 1/096775* (2013.01); *G08G 1/096783* (2013.01); *G08G 1/096791* (2013.01); *G08G 1/096816* (2013.01); *G08G 1/096827* (2013.01); *G08G 1/096844* (2013.01); *B60W 2552/35* (2020.02); *B60W 2554/00* (2020.02); *B60W 2555/20* (2020.02); *G05D 1/027* (2013.01); *G05D 2201/0213* (2013.01)

(58) Field of Classification Search
CPC ....... G08G 1/096844; G08G 1/096725; G08G 1/0116; G08G 1/0129; G08G 1/048; G08G 1/096775; G08G 1/096791; G08G 1/096827; B60W 30/00; B60W 30/12; B60W 30/18163; B60W 30/0956; B60W 2552/35; B60W 60/00; B60W 2556/65; B60W 40/06; G07C 5/008; G01C 21/3461

See application file for complete search history.

(56) References Cited

U.S. PATENT DOCUMENTS

| | | | |
|---|---|---|---|
| 6,151,539 A | 11/2000 | Bergholz | |
| 8,060,308 B2 | 11/2011 | Breed | |
| 8,352,111 B2 | 1/2013 | Mudalige | |
| 8,937,546 B1 | 1/2015 | Baron, Sr. | |
| 9,008,890 B1 | 4/2015 | Herbach | |
| 9,024,786 B1 | 5/2015 | Jones | |
| 9,079,587 B1 | 7/2015 | Rupp | |
| 9,110,196 B2 | 8/2015 | Urmson | |
| 9,171,465 B2 | 10/2015 | Katayama | |
| 9,188,981 B2 | 11/2015 | Israelsson | |
| 9,188,985 B1 | 11/2015 | Hobbs | |
| 2002/0067289 A1 | 6/2002 | Smith | |
| 2003/0069683 A1 | 4/2003 | Lapidot | |
| 2008/0134955 A1 | 6/2008 | Morrow | |
| 2012/0086582 A1 | 4/2012 | Durekovic | |
| 2013/0035901 A1 | 2/2013 | Breed | |
| 2014/0032108 A1 | 1/2014 | Zeng | |
| 2014/0081573 A1 | 3/2014 | Urmson | |
| 2014/0210645 A1 | 7/2014 | Sharma | |
| 2014/0316865 A1 | 10/2014 | Okamoto | |
| 2015/0066355 A1 | 3/2015 | Siegel | |
| 2015/0109146 A1 | 4/2015 | Drobot | |
| 2015/0199904 A1 | 7/2015 | Lee | |
| 2015/0241880 A1 | 8/2015 | Kim | |
| 2015/0266488 A1 | 9/2015 | Solyom | |
| 2015/0266490 A1 | 9/2015 | Coelingh | |
| 2015/0292894 A1 | 10/2015 | Goddard | |
| 2016/0019782 A1 | 1/2016 | Alam | |
| 2016/0025505 A1 | 1/2016 | Oh | |
| 2016/0086285 A1 | 3/2016 | Jordan Peters | |
| 2016/0146618 A1 | 5/2016 | Caveney | |
| 2016/0169690 A1* | 6/2016 | Bogovich | G08G 1/205 701/423 |
| 2016/0171521 A1 | 6/2016 | Ramirez | |
| 2017/0356746 A1* | 12/2017 | Iagnemma | G01C 21/34 |
| 2018/0113460 A1* | 4/2018 | Koda | B60W 60/0011 |

FOREIGN PATENT DOCUMENTS

| | | |
|---|---|---|
| EP | 2023125 A1 | 2/2009 |
| EP | 2063255 A3 | 5/2009 |
| EP | 2972096 B1 | 1/2016 |
| GB | 2524384 A | 9/2015 |
| JP | 5891314 B2 | 3/2016 |
| KR | 20140117836 A | 10/2014 |
| KR | 101581286 B1 | 7/2015 |
| NL | 1040228 C | 12/2014 |
| WO | 1998004931 A1 | 2/1998 |
| WO | 2010103504 A1 | 9/2010 |
| WO | 2014139821 A1 | 9/2014 |
| WO | 2014148989 A1 | 9/2014 |
| WO | 2015151055 A1 | 10/2015 |
| WO | 2016087901 A1 | 6/2016 |
| WO | 2016163929 A1 | 10/2016 |

OTHER PUBLICATIONS

Lioris, J., et. al., "Platoons of Connected Vehicles Can Double Throughput in Urban Roads". Arxiv.org, arXiv:1511.00775, available at: https://arxiv.org/abs/1511.00775v2, Feb. 2, 2017, pp. 1-20.

Guo, C., et. al., "Self-Defensive Coordinated Maneuvering of An Intelligent Vehicle Platoon in Mixed Traffic". 15th International IEEE Conference on Intelligent Transportation Systems, Sep. 16-19, 2012, pp. 1726-1733.

Eilers, S., "Information Model for Platoon Services". European Commission Seventh Framework Program, Companion D3.2, Sep. 30, 2015, pp. 1-44.

Marjovi, A. et. al, "Specifications for the Enhancement to Existing LDM and Cooperative Communication Protocol Standards". AutoNet2030, 7th Framework Program, Project No. 610542, Feb. 6, 2015, 136 pages.

Marjovi, A. et. al., "Distributed Graph-Based Convoy Control for Networked Intelligent Vehicles". IEEE Intelligent Vehicles Symposium (IV), (2015), 6 pages.

Ferrara, A., et. al., "Sliding Mode Control for Automatic Driving of a Platoon of Vehicles". Proceedings of International Workshop on Variable Structure Systems, Jun. 5-7, 2006, pp. 262-267.

Wikipedia, "Vehicle Category". Wikipedia web article modified on Nov. 26, 2015, available at: https://en.wikipedia.org/w/index_php?title=Vehicle_category&oldid=692517112, 6 pages.

SAE, "Taxonomy and Definitions for Terms Related to On-Road Motor Vehicle Automated Driving Systems". Standard J3016, issued Jan. 16, 2014 (Jan. 16, 2014). Society of Automotive Engineers, 12 pages.

Wiki' "TMC/Event Code List". Wiki web article dated Jan. 16, 2014, available at: https://wiki.openstreetmap.org/w/index.php?title=TMC/Event_Code_List&oldid=981793, 79 pages.

Cottingham, D., "What Is a Vehicle Platoon?". Driver Knowledge Test web article, Jan. 29, 2014, 4 pages.

International Search Report and Written Opinion of the International Searching Authority for PCT/US2017/064851 dated Mar. 14, 2018.

(56) References Cited

OTHER PUBLICATIONS

Baudouin Dafflon et al: "A layered Multi-Agent Model for Multi-Configuration Platoon Control:", Proceedings of the 10th International Conference on Informatics in Control, Automation and Robotics, Dec. 31, 2013 (Dec. 31, 2013), pp. 33-40, XP055454494, DOI: 10.5220/0004632500330040. ISBN: 378-989-8565-71-6.

Madeleine El-Zaher et al: "Vehicle Platoon Control with Multi-Configuration Ability", Procedia Computer Science, vol. 9, Dec. 31, 2012 (Dec. 31, 2012), pp. 1503-1512, XP028517172, ISSN: 1877-0509, DOI: 10.1016/J.PROCS.2012.04.165.

Hyvonen, M., et. al., "Assistive Situation Awareness System for Mobile Multimachine Work Environments". In IEEE Transactions on Intelligent Transportation Systems, vol. 16, No. 6, Dec. 2015, pp. 3403-3413.

Jokela, M., et. al., "Road Condition Monitoring System Based on a Stereo Camera". In IEEE 5th International Conference on Intelligent Computer Communication and Processing, Cluj-Napoca, (2009), pp. 423-428.

Viikari, V., et. al., "Automotive Radar Technology for Detecting Road Conditions. Backscattering Properties of Dry, Wet, and Icy Asphalt," European Radar Conference, (2008)., EuRAD 2008, pp. 276-279.

Niaboulsi, M., et. al., "Fog Attenuation Prediction for Optical and Infrared Waves". Optical Engineering. vol. 43. Issue 2., Feb. 2004, pp. 319-329.

Harikumar, R., et. al., "Variation of Rain Drop Size Distribution with Rain Rate at a Few Coastal and High Altitude Stations in Southern Peninsular India". In Advances in Space Research, vol. 45, Issue 4, Feb. 15, 2010, pp. 576-586.

International Preliminary Report on Patentability for PCT/US2017/043947 dated Feb. 5, 2019, 7 pages.

International Preliminary Report on Patentability for PCT/US2017/064851 dated Jun. 11, 2019, 7 pages.

International Search Report and Written Opinion of the International Searching Authority for PCT/US2017/043947 dated Oct. 13, 2017.

Arage, A., et. al., "Effects of Water and Ice Layer on Automotive Radar". In Proceedings of the German Microwave Conference 2006, (2006), 5 pages.

International Transportation Forum, "Automated and Autonomous Driving; Regulation under uncertainty". Corporate Partnership Board Report, OECD/ITF (2015), 32 pages.

Rasshofer, R.H., et. al., "Influences of Weather Phenomena on Automotive Laser Radar System". In Advances in Radio Science, 9, pp. 49-60, (2011).

Rigole, P. J., "Study of a Shared Autonomous Vehicles Based Mobility Solution in Stockholm". Masters of Science Thesis, at Industrial Ecology Royal Institute of Technology, (2014), 41, pages.

Krajzewicz, D., et. al., "Evaluation of the Performance of city-wide, autonomous Route Choice based on Vehicle-to-vehicle-Communication". For presentation and publication in 87th Annual Meeting Transportation Research Board, Jan. 2008, 13 pages.

Glaser, S., et al., "Maneuver-Based Trajectory Planning for Highly Autonomous Vehicles on Real Road with Traffic and Driver Interaction". Submitted to IEEE Transaction on Intelligent Transportation System, (2009), 15 pages.

Resende, P., et. al., "Real-time Dynamic Trajectory Planning for Highly Automated Driving in Highways". In Intelligent Transportation Systems (ITSC), 2010 13th International IEEE Conference, (2010), 7 pages.

ERTRAC, "Automated Driving Roadmap". ERTRAC Task Force, Connectivity and Automated Driving, Version 5.0., dated Jul. 21, 2015, 48 pages.

Imobility Forum, "Roadmap: Automation in Road Transport". Version 1.0., May 2013, 37 pages.

ETSI, "Intelligent Transport Systems (ITS); V2X application; Part 1: Road Hazard Signalling (RHS) application requirements specification". ETSI TS 101 539-1 V1.1.1 (Aug. 2013) standard specification, 38 pages.

SAE International, "Automated Driving". SAE J3016 standard brochure. Web Archive dated Jul. 18, 2017, at: https://web.archive.org/web/20170718182646/http://www.sae.org/misc/pdfs/automated_driving.pdf.

Wikipedia, "Disdrometer". Web Archive dated Jul. 21, 2017, from: https://web.archive.org/web/20170721025925/https://en.wikipedia.org/wiki/Disdrometer.

Leinonen, J., et. al., "A Climatology of Disdrometer Measurements of Rainfall in Finland over Five Years with Implications for Global Radar Observations". In Journal of Applied Meteorology and Climatology, vol. 51, Feb. 2012, pp. 392-404.

* cited by examiner

SYSTEM AND METHOD FOR OPTIMIZING AUTONOMOUS VEHICLE CAPABILITIES IN ROUTE PLANNING

CROSS-REFERENCE TO RELATED APPLICATIONS

The present application is a national stage application under 35 U.S.C. 371 of International Application No. PCT/US2017/043947, entitled SYSTEM AND METHOD FOR OPTIMIZING AUTONOMOUS VEHICLE CAPABILITIES IN ROUTE PLANNING, filed on Jul. 26, 2017, which claims benefit under 35 U.S.C. § 119(e) from U.S. Provisional Patent Application Ser. No. 62/370,064, filed Aug. 2, 2016, entitled "SYSTEM AND METHOD FOR OPTIMIZING AUTONOMOUS VEHICLE CAPABILITIES IN ROUTE PLANNING", which is incorporated herein by reference in its entirety.

BACKGROUND

Ruts on a road may be a problem in the winter and summer. The worst case occurs during wintertime, when the road surface friction is not steady along the road cross-section. Heavy traffic wears down the icy and slippery surface to reveal the road surface, which may be the best driving surface.

FIG. 1A is a perspective view 100 of road wear ruts 110 that may cause aquaplaning risks in warmer months. FIG. 1B is a perspective view 150 of tire tracks 160 in the winter where use of a road packs down the snow and ice and, with enough use, reveals the asphalt. FIG. 2 further illustrates use of a road 200 in winter. Vehicle use of a road covered in snow causes ruts and eventually the appearance of bare asphalt. In locations where tire studs are allowed, road surfaces 320 may show ruts due to heavy vehicle use. See FIG. 3B. In warmer months, the ruts on road surfaces 340 fill up with water and create a risk of aquaplaning (or hydroplaning). Lateral position, depth, and slopes of ruts in a lane vary. In a city environment, a vehicle may avoid driving through pools of water to prevent splashing pedestrians. FIG. 3A shows a perfectly flat road surface 300. FIG. 3B shows ruts caused by vehicle wear. FIG. 3C shows ruts filled with water.

If road irregularities (such as ruts due to wear) are widespread, such irregularities present increased risk for driving during and after a weather condition, such as rain. During wintertime, the problem is reversed because road conditions are usually worse outside ruts.

During wintertime, a related problem exists when there are only three ruts in which to drive, which may occur due to narrow roads. When two vehicles approach each other, there can be confusion as to how they will pass safely.

SUMMARY

This specification addresses the problem of finding the safest trajectory along the lane. There are cases where the best lateral position in a lane is not necessarily the center-line. In those cases, an autonomous vehicle may adjust its lateral position to maximize safety and driving speed.

An exemplary system determines an optimal lane trajectory and route for an autonomous vehicle (AV) under changing road conditions and forecasts autonomous car performance along a planned route. The system analyzes a road's profile and receives a profile from other vehicles or infrastructures. The system determines the safest lateral position in the lane. In ice or snow, a vehicle may follow tracks made by previous vehicles in the snow or ice, even if following such tracks does not place the vehicle in the center of the lane. In warmer weather, a vehicle may drive outside the ruts in the road to avoid a risk of aquaplaning or to reduce vibration of vehicle passengers. The system determines when to override a default lateral lane position due to dynamic road conditions, such as snow on the roads, partial lane blockage, or potential aquaplaning and to provide new offset/lane clearance information to vehicles. The system uses dynamic road condition information to calculate a vehicle route that maximizes autonomous vehicle system benefits and to forecast autonomous vehicle performance along a planned route. Vehicles have different equipment and some vehicles have better radar systems which work well in foggy conditions whereas LIDAR systems may use alternative route or manual driver support. Some vehicles may greatly benefit from intersection assistance systems whereas other vehicles may be able to operate reliably on roads without lane markings. The vehicle control system uses the limitations of these sensors when the vehicle control system calculates the route to take.

An exemplary method described herein accounts for expected autonomous vehicle (AV) drivability of a route segment by receiving expected AV drivability data for the route segment, modifying navigation-route data based on the received expected AV drivability data for the route segment, and transmitting the modified navigation-route data to a navigation system for the AV.

BRIEF DESCRIPTION OF THE DRAWINGS

A more detailed understanding may be had from the following description, presented by way of example in conjunction with the accompanying drawings.

DETAILED DESCRIPTION

Road Condition Assessment.

Continuously changing road conditions are challenging for vehicle sensor systems. Autonomous vehicles may survey a road without any problems, but an alternative, longer route may be a better choice for some autonomous functions. Currently, navigation systems may calculate a route to minimize fuel consumption, travel time, or $CO_2$ emissions. However, route planning systems are not fully optimized to calculate the route which optimizes opportunities to use different autonomous functions, such as when collaboration between two vehicles may be beneficial. Challenging conditions for autonomous vehicles occur when environmental conditions change during the day, and the abilities of vehicle environment perception systems for automated driving vary according to sensor type.

During the transition phase from manual- (or human-) driven vehicles to autonomous vehicles, there will be different levels of sensor setups available in vehicles. In addition, the level of automation will be different and some vehicles may be equipped with intersection assistance systems whereas other vehicles may have highway and overtaking assistance functionality on-board. Some autonomous functions may use lane markings to function properly but other functions do not. Autonomous functions may be performed differently depending on criteria such as weather conditions, road conditions, and types of landmarks along a route. In many cases, several route options exist, and navigators may be set to optimize travel time, distance, or environment foot-print. Therefore, a navigation and route planning system may make routing decisions where a driver's interaction with the vehicle is minimized.

Figure 1B:
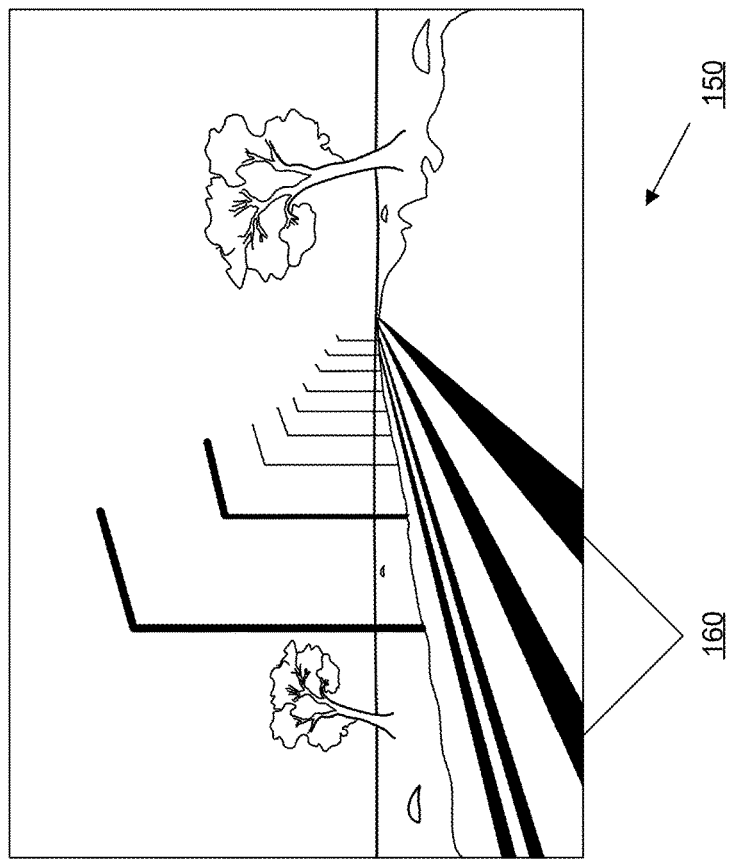
FIG. 1B is a schematic illustration of a road in the winter with tracks in the snow caused by vehicle use.
Figure 1A:
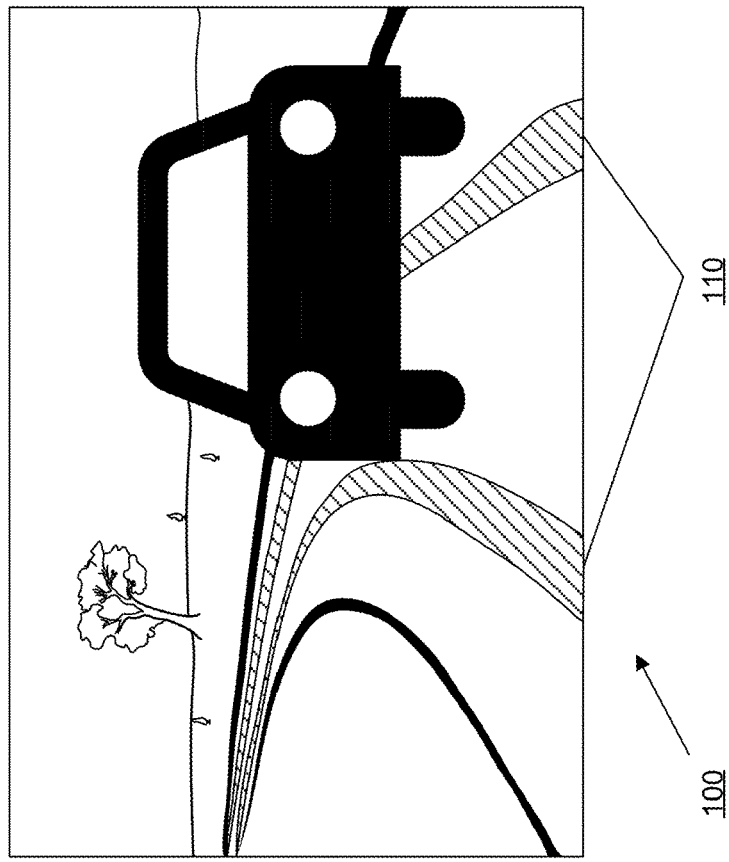
FIG. 1A is a schematic illustration of a road in the summer with ruts in the pavement.
Figure 2:
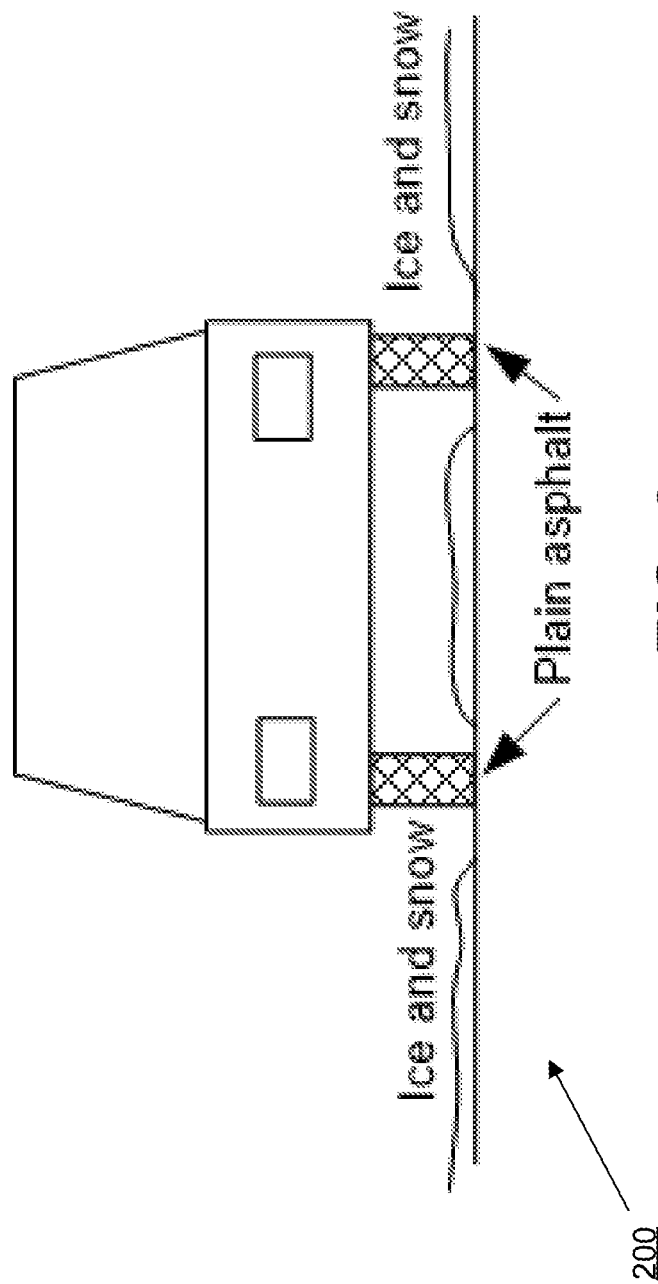
FIG. 2 is a schematic cross-sectional view of road conditions following a snowfall and vehicle road use.
Figure 3C:
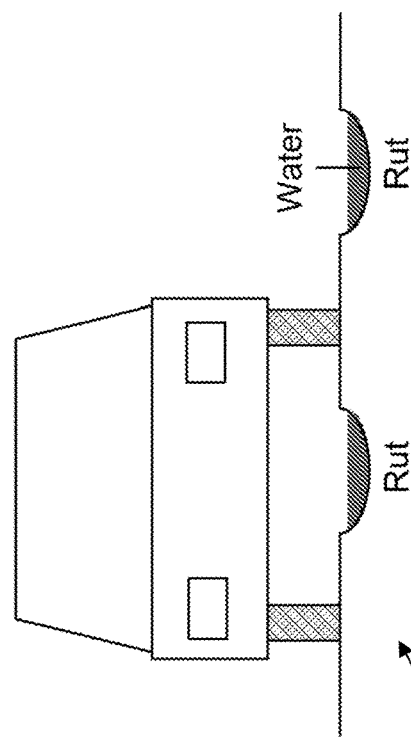
FIGS. 3A, 3B, and 3C are schematic cross-sectional views comparing a perfect road surface with ruts formed by vehicle use and ruts filled with water.
Figure 3B:
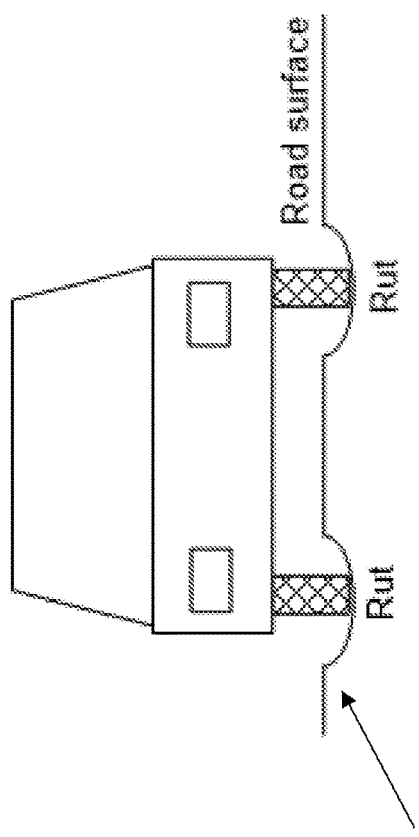
Figure 3A:
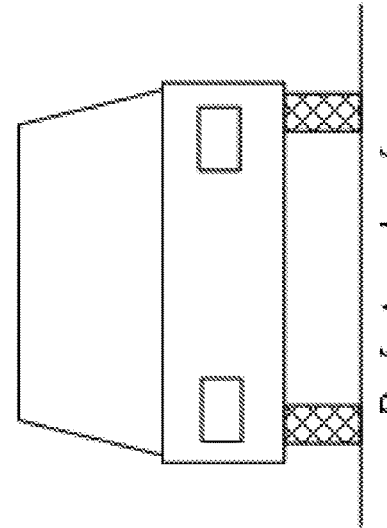
Figure 4:
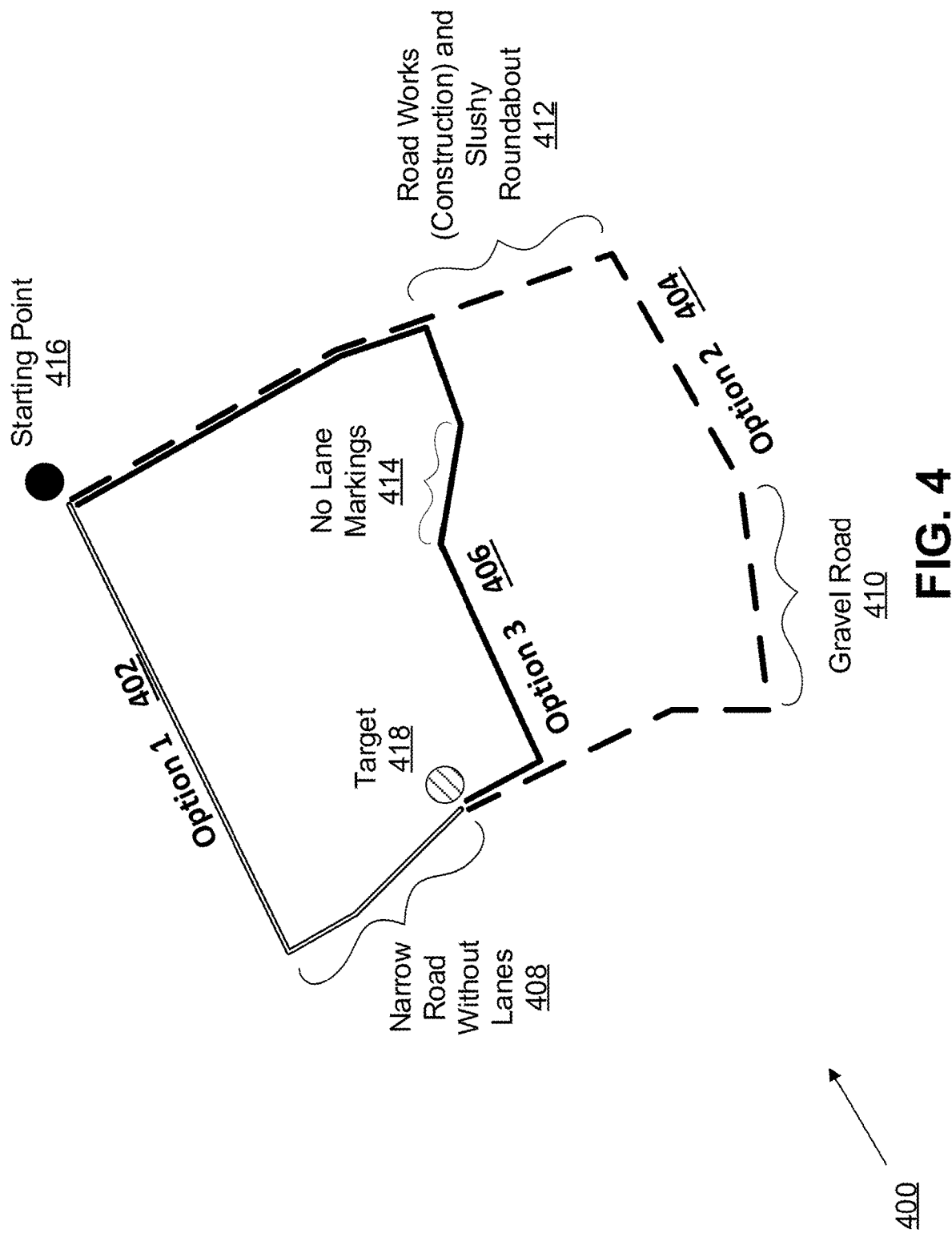
FIG. 4 is a schematic illustration of a route selection map.

Existing navigation systems do not optimize routing according to available in-vehicle autonomous driving systems when the environment conditions or road type changes. Moreover, the shortest and fastest route may not be the most optimal route when a driver's preferences are part of the route calculations. FIG. 4 shows a map 400 with multiple routes 402, 404, 406 and different conditions 408, 410, 412, 414 present on each option 402, 404, 406 for going between a starting point 416 and target 418.

Figure 5:
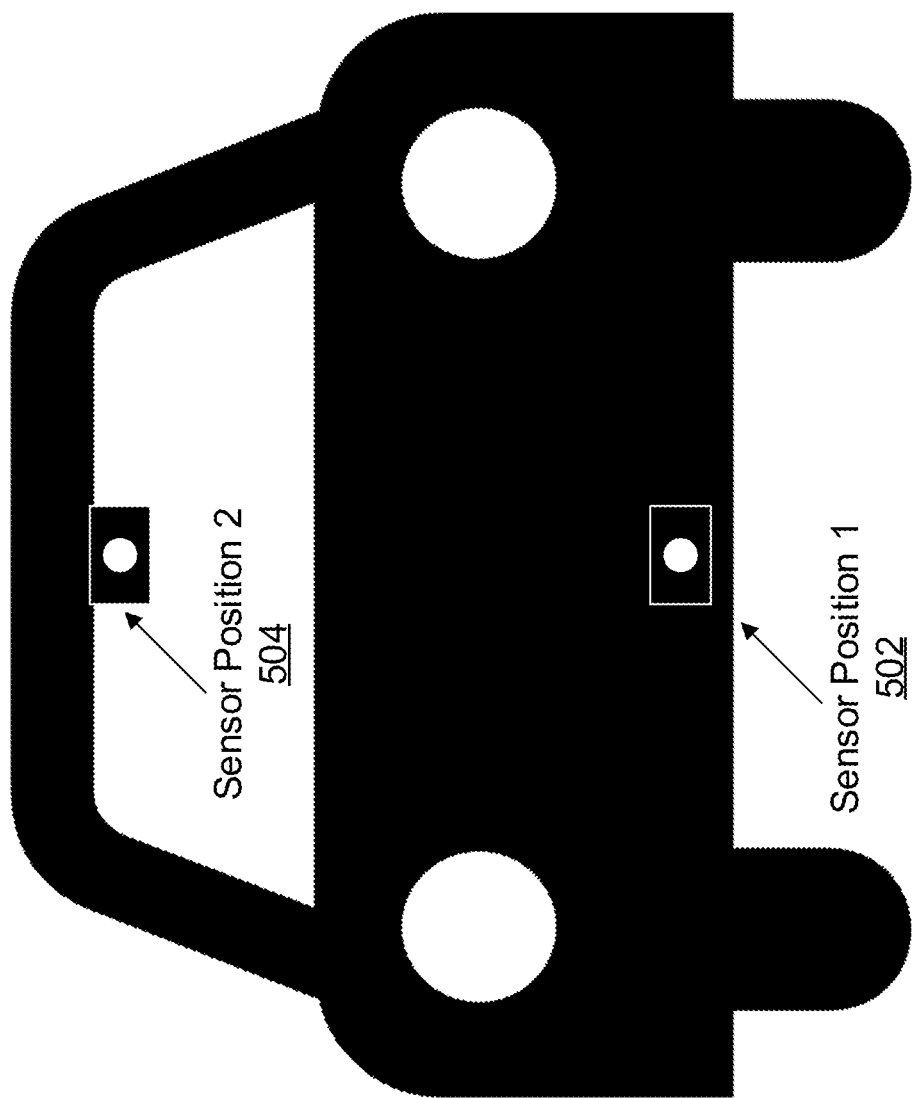
FIG. 5 is a schematic front perspective view of a vehicle illustrating two possible front-facing sensor positions.

Current autonomous functions rely heavily on lane markings on the road, and some automated functions may not be used with a gravel road. Likewise, some automated functions may not be used when snow and dirt cover lane markings. The problem exists also when road conditions and road geometry change over time. Such cases may occur, for example, when snow banks dynamically change a road's profile. Some sensors are less reliable in foggy conditions (e.g., cameras) or when radar fails due to large trees and bushes on the side of a road. Furthermore, mounting position of the sensor influences the sensor's performance. Sensors in the front bumper may be vulnerable to dirt, dust, and snow, whereas sensors located behind the front windshield are less sensitive to adverse weather conditions. FIG. 5 shows a car 500 with the differences between these two optional sensor positions 502, 504. Sometimes lack of GPS signals in narrow city streets, near tall buildings, or in a tunnel may be a problem because positioning systems may rely mostly on satellites, even if accuracy is improved with the use of other in-vehicle sensors, such as inertia sensors.

Autonomous vehicle functions also rely heavily on environment perception sensors. Weather conditions affect the performance of sensors in different ways. Environment perception sensors also have limited range. One focus of perception sensor development is to increase detection range, which makes sensors more vulnerable to bad weather conditions. Car manufactures use different set of sensors from different sensor manufacturers. This means that autonomous cars will not have equal performance. Today, the automotive industry uses radar systems that operate at 24 GHz or 77 GHz and cameras that operate on visible light and near the infrared region. The automotive industry also uses LIDAR systems that typically operates at 700-1400 nm in the infrared region and thermal imaging systems that use long wavelength infrareds of 8-15 µm.

Figure 6:
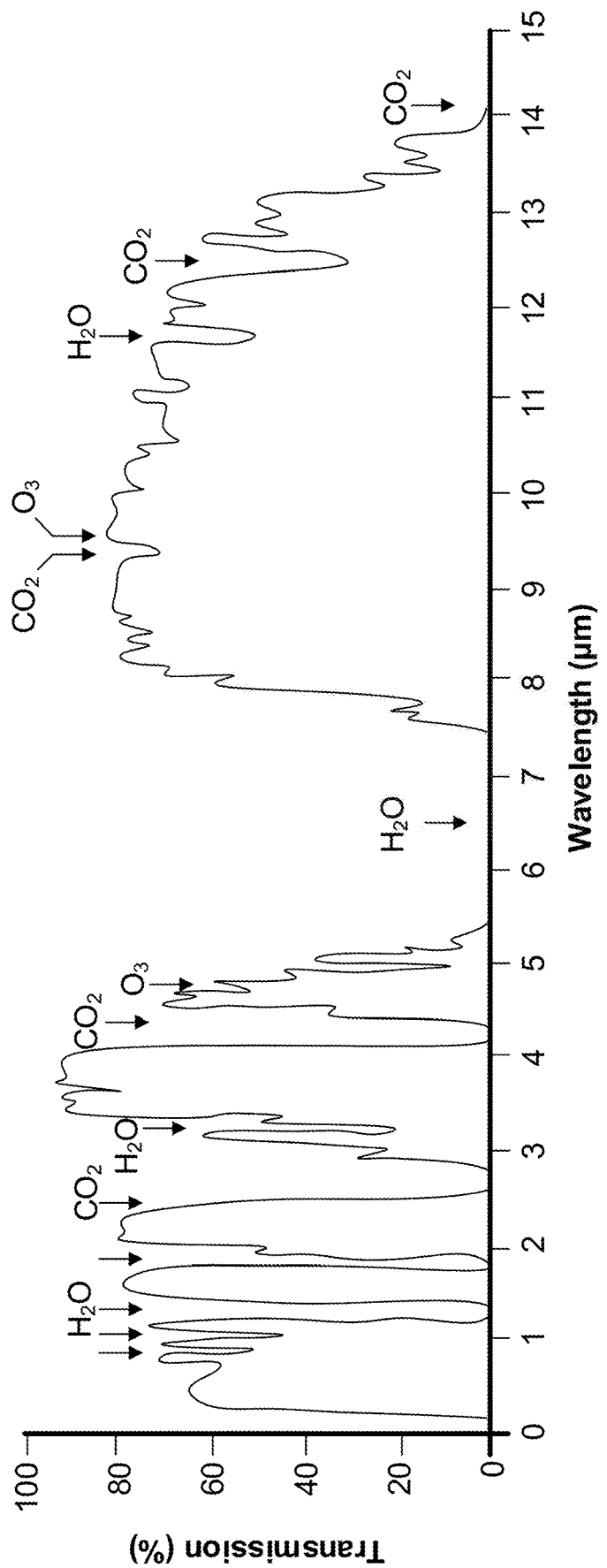
FIG. 6 is a graph of water absorption for wavelengths in the range of 0 μm to 14 μm.

FIG. 6 shows a graph 600 of water absorption at different wavelengths in the infrared region. Thermal imaging sensors use wavelengths over 8 µm due to the heavy absorption of water for wavelengths under 7.5 µm. Thermal imaging works well in fog, unless the fog is especially dense. In such situations, thermal imaging is unable to make reliable measurements. When the ambient environment temperature is about 98.6° F. (37° C.), thermal imaging is unable to detect humans reliably. FIG. 6 shows, for example, that for wavelengths of 5.5 µm to 7.5 µm, thermal imaging is not useful for detection because of heavy absorption of water molecules. Water is also absorbed wavelengths of 1.4 µm, 2.8 µm, and 11.5 µm.

Radar systems are robust in bad weather conditions. Degradation is partly related to water droplet size, but degradation is dominated by the thickness of water layer covering the antenna or radome. Therefore, radar operates well in all but the heaviest rains, but water, snow or ice cover on a radar system has a strong effect on radio wave propagation. A 0.56 mm layer of water on a radar radome will absorb almost all of the transmitted energy of a 76.5 GHz radar signal. Arage, Alebel, et al., *Effects of Water and Ice Layer on Automotive Radar*, PROCEEDINGS OF THE GERMAN MICROWAVE CONFERENCE 2006 (2006).

Optical sensors are also affected by rain, snow fall, fog, mist, and dust in the air or over the lens. Also, direct sunlight usually saturates the sensor. Cameras may use additional lighting when targets are in the dark.

Figure 7:
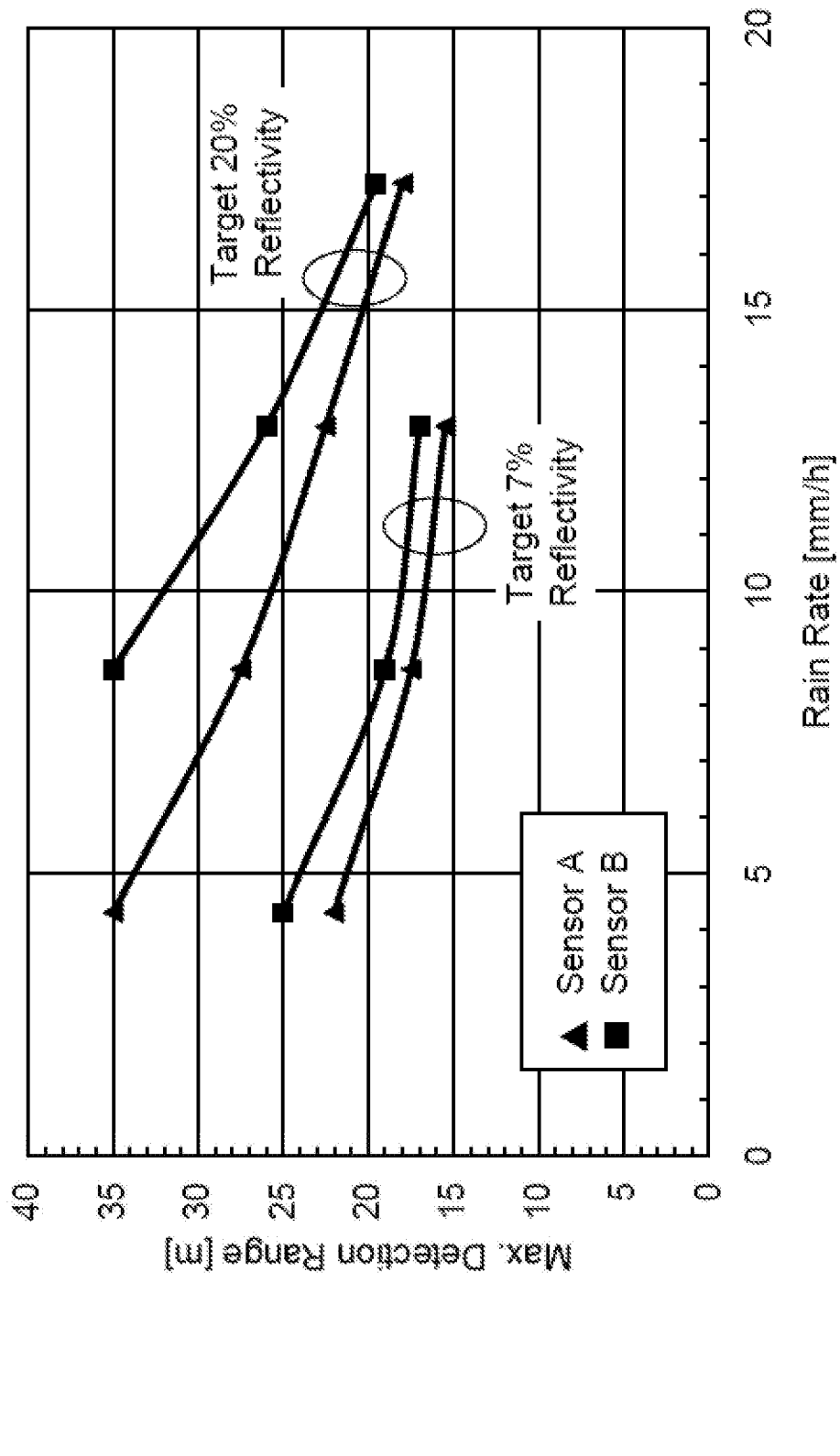
FIG. 7 is a graph of the effect of the rain rate on the detection range of a LIDAR system

LIDAR uses active lighting in the infrared region (typical 905 nm). LIDAR performance in bad weather conditions may be improved with multi-echo technology. FIG. 7 is a graph 700 that shows the effect of the rain rate on the detection range of a LIDAR system. Water droplets (e.g., rain or fog) and snowflakes cause backscattering and returned echoes that weaken the system rapidly. This condition shortens the effective measurement range rapidly, as shown in FIG. 7 Weather conditions also change the environment's reflectivity and cause performance problems for LIDAR sensors. R. H. Rasshofer, M. Spies, and H. Spies, *Influences of Weather Phenomena on Automotive Laser Radar Systems*, 9 ADVANCED RADIO SCIENCE 49-60 (2011).

Rain droplet size may be measured directly with a disdrometer when the droplet size is between 0.3 mm-5 mm. Alternatively, droplet size distribution may be estimated based on rain rate, such as by using a relationship stated in Rasshofer, at 54. Rain rate may be used for a degradation estimate of droplet size distribution if the droplet size distribution is not available from a weather data service.

Current systems for sensor performance estimation are based on measurements in vehicles, which may mean that autonomous vehicles may only measure the current weather and the effect on sensor performance. Current road weather measurements and forecasts provide data for human purposes only, such as for drivers (by providing road weather warnings, for example) and for traffic management (to determine when to change variable speed limits according to the road weather). The present disclosure, on the other hand, describes services that measure, predict, or forecast the performance of the autonomous car environment perception system according to weather conditions. Exemplary services further make use of road weather forecasts that account for frequency ranges outside the visible region.

Exemplary Systems and Methods.

Exemplary embodiments disclosed herein operate to take into account variable road and weather conditions as they relate to control of an autonomous vehicle. Previous systems for autonomous driving have generally been directed to driving under stable weather conditions. Exemplary systems and methods disclosed herein also address risks that may occur when vehicle velocity (and vehicle efficiency) are increased. In some embodiments, systems and methods described herein operate to determine whether to drive in the ruts or not and to adjust the lateral lane position and the speed of the vehicle in the lane. Exemplary embodiments may thus increase driving safety without reducing excessively the AV speed. In some embodiments, an autonomous vehicle in a city environment is directed to avoid driving through pools of water and splashing pedestrians.

In exemplary embodiments, a driver or vehicle is provided with the opportunity to select a route where autonomous driving functions may be maximized. Such embodiments can make autonomous driving more comfortable for drivers by maximizing use of automated vehicle functions. Such embodiments may use available sensors in cars passing the route and records in memory the autonomous functions which failed. This information may be used to estimate if a host vehicle has the proper sensors and functions to survey in a route. In addition, position of a sensor may make an impact on sensor performance.

In some embodiments, systems and methods disclosed herein are provided with the ability to measure, predict, and forecast the performance of an autonomous vehicle (AV) environment perception system according to weather conditions. Such embodiments may analyze whether autonomous driving may or may not be used, or whether automated driving may be used under a restricted set of conditions (such as reduced speed). Such embodiments may forecast AV performance along a planned route and communicate route information to a traffic management service (such as data used for predicting an impact on traffic flow).

Exemplary systems and methods use vehicle sensors to measure a road's profile, detect potential ruts, and perform risk analysis. Based on the results of the analysis, vehicle lateral position and speed may be adjusted to a minimum-risk trajectory. Analysis may be based on road rut depth and road condition in and out of the ruts. During wintertime, the vehicle may drive in the ruts because the road surface contains snow, ice, or slush outside the ruts, and the vehicle may be directed to slow down to avoid skidding. During summertime, aquaplaning may be a risk. The risk of water-filled ruts is greatest during rain. Falling rain is detectable with on-board sensors. Risk of aquaplaning may exist for a while after the rain. Previous weather conditions may be received from a weather data provider, and upcoming road conditions may be received from other vehicles.

In an exemplary embodiment, when a vehicle detects an obstacle on the road, such as a construction cone or a snow pile bank at the edge of the road, and an obstacle is laterally displaced more than a threshold distance from the road side, the vehicle determines whether to request a dynamic map layer from a server. The first vehicle, such as a snow plow, that clears a lane in a road may communicate that the route segment is disrupted and report the distance from the edge of the clearance to the road side. The clearance values may be reported using distance measuring sensors mounted on the sides of the first vehicle (such as RADAR, LIDAR, or SONAR sensors).

When a second vehicle approaches a road segment and determines, using a perception sensor, that an obstacle is on the road, the second vehicle may determine if the obstacle is more than a threshold distance away from the road side. If such a condition is determined to be true, the second vehicle requests clearance information from a cloud server. If clearance information is available, the second vehicle follows a vehicle trajectory provided by the cloud server. If the cloud server does not have information for the disrupted segment, the second vehicle may indicate to the user to move to manual mode.

Figure 8:
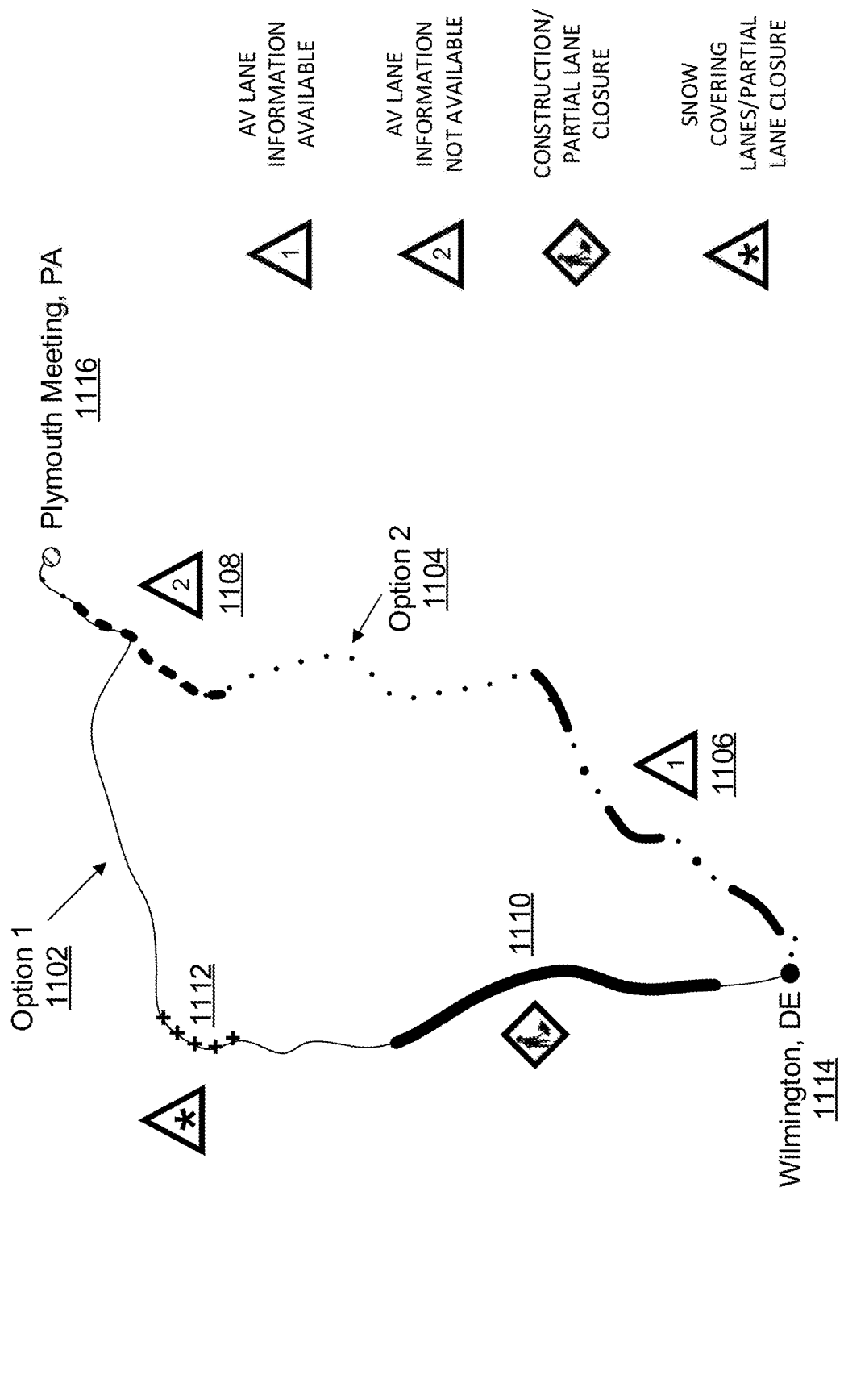
FIG. 8 is a schematic illustration of a map for route selection with different conditions present for each option.

FIG. 8 shows route selection based on availability of dynamic lanes and ruts information. The map 1100 in FIG. 8 shows, as an example, two options 1102, 1104 for an autonomous vehicle to travel from Wilmington, Del. 1114 to Plymouth Meeting, Pa. 1116. Option 1 (1102) is shown with a thin, solid line, while option 2 (1104) is shown with small dots. Dash-dot lines next to a triangle with a "1" (1106) show locations where AV lane information is available. Dashed lines next to a triangle with a "2" (1108) show locations where AV lane information is not available. Thick, solid lines next to a construction symbol 1110 shows locations where there is construction causing a partial lane closure. Routes marked with plus signs 1112 show locations where snow is covering the lanes causing a partial lane closure. A route may comprise a plurality of route segments.

Figure 9:
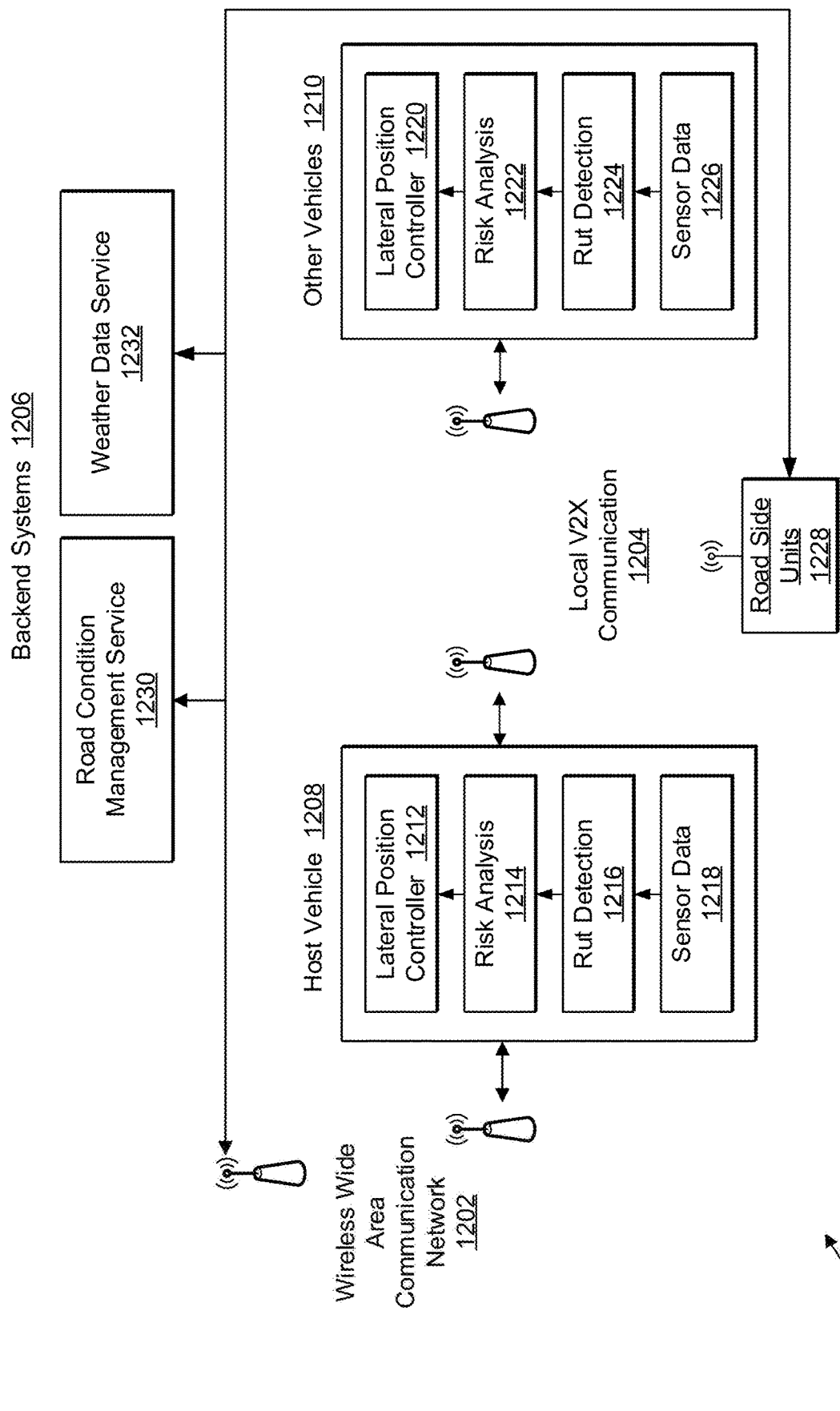
FIG. 9 is a system architecture diagram of an exemplary system for sharing road condition information and controlling vehicle lateral position.

FIG. 9 shows interfaces for sharing data among five components: a road condition management service, a weather data service, a host vehicle, a plurality of other vehicles, and a plurality of roadside units. For some embodiments, a host vehicle (which may be either an automatic or autonomous vehicle), has an in-vehicle computing system comprising: sensors for road profile measurement (e.g., a LIDAR system and a stereo vision camera for rut detection), sensors for water, snow, and ice detection (challenging road conditions), a wide area wireless communication unit for backend service communication, a short range wireless communication system, and a computing platform for risk analysis. For some embodiments, another component is a road condition management service. This road condition management service maintains, collects, and provides road condition data. For some embodiments, a backend connection to a weather service is provided. This weather service processes weather information and provides local weather data (or weather reports) for a route segment. For some embodiments, road side units collect road condition data from passing vehicles and deliver road condition data to passing vehicles.

FIG. 9 is an interface/architecture diagram 1200 of the components discussed above in one exemplary embodiment. The backend systems 1206, namely the road condition management service 1230 and the weather data service 1232, are shown at the top of the diagram. Both of these components are connected to the road side units 1228, shown at the bottom of the diagram. The road side units 1228, in some embodiments, have a connection to a short range wireless system 1204, while the road condition management service 1230 and the weather data service 1232 have connections to wide area wireless communication systems 1202.

On the left side of FIG. 9, there is a block representing a host vehicle 1208. In some embodiments, the host vehicle 1208 contains sensor data 1218, which is sent to a rut detection module 1216. Sensor data 1218 may include measurements of a route segment's external environment. Such measurements of the external environment (which may be made by an autonomous vehicle road environment sensor) may be communicated to a server (or backend server). A rut detection module 1216 connects to a risk analysis module 1214. The risk analysis module 1214 performs calculations to assess the risk based on detected ruts and other data received from wireless connections to a road condition management service 1230, a weather data service 1232, and a plurality of road side units 1228. The risk analysis module 1214 communicates the results of the risk analysis calculations to the lateral position controller 1212. The lateral position controller 1212 determines the optimal vehicle lane position based on the risk analysis calculations. In some embodiments, optimal lane trajectory may also be calculated, which is a combination of lateral lane offset from lane centerline, rut offset from lane centerline, distance from left road edge of a route segment, distance from right road edge of a route segment, and compass heading. In some embodiments, a lateral lane offset measurement includes GPS location, left and right distance from a road's edge, and lateral lane offset calculated from the lane centerline. For some embodiments, a calculated lane trajectory for a route segment is communicated to a server (or backend server). Such communications of a route segment vehicle information set to a server (or backend server) may also include information regarding AV sensor capabilities, usage, and disruptions while traversing a route segment, and information regarding whether a vehicle traveled inside or outside ruts for the route segment. A host vehicle 1208 may also comprise: a wireless communication circuit for communicating with roadside units 1228, backend servers, and other vehicles 1210; a processor; and modules to perform lateral lane position control, risk analysis, and rut detection. Other vehicles 1210 may also comprise a lateral position controller module 1220, a risk analysis module 1222, a rut detection module 1224, and sensor data 1226.

Risk analysis may be based on the presence of the ruts, which may be measured with onboard sensors and confirmed from the road condition information. The system may provide measurement data to the road maintenance authorities, maintainers of road condition management services. Onboard sensors may classify a road surface to a few categories/conditions such as dry asphalt, wet asphalt, water, ice and snow. In some embodiments, risk analysis is based on host vehicle sensors only when other sources, such as weather data, road condition data, and broadcast messages from other vehicles are not available.

Without autonomous vehicles having the ability to adapt according to changing driving conditions, the use of the automatic/autonomous driving becomes poor. Reducing the risk level may enable autonomous vehicles to be efficient and to keep driving speeds high. Road conditions may be measured with vehicle perception sensors, such as stereo vision or LIDAR, but such systems may not be reliable in certain conditions. This specification describes systems and methods that perform risk assessment for a route segment, and when lane markers are not visible, in an exemplary embodiment, a driver may be alerted to switch to manual driving. For some embodiments, the system may also adjust a host vehicle's lateral lane position and speed based on the risk assessment. For example, if snow is still falling, the LIDAR range may be limited, and existing lane markers and ruts/tracks formed by other cars may be continuously fading due to snow falling while the vehicles are driving on the road. In such situations, getting safe driving information from other vehicles, including road safety vehicles and snow ploughs, that have already driven the road may be useful to extend the conditions in which a vehicle may be driven in AV mode. If risk assessment exceeds a risk threshold, a vehicle may switch to manual driving mode.

There are differences between sensor systems and their capabilities to measure parameters. Therefore, also safety margins between vehicles are different. If, for example, a friction measurement is inaccurate, a vehicle without other methods to determine road friction may reduce vehicle speed to leave more safety margin, while a vehicle (such as a car) with a high-end measurement system that has more than one way to determine road friction may drive at higher velocities.

Tire type and tire condition may have an impact on risk assessment. Winter tires may have more grip than standard tires when they are in good condition. In summer, a tire's tread depth affects its ability to resist aquaplaning. In general, with good standard (or friction) tires, a driver may increase driving speed significantly. However, tire conditions are difficult to verify, but estimation of tire age and mileage may be used to assess actual wearing.

Another factor used in risk analysis in some embodiments is vehicle (or car) characteristics. Staying inside the lane boundaries may be part of safe driving. If the measured lateral offset is too large and the vehicle is wide, passing through a narrow passage may force a vehicle to go over the lane limits. In one embodiment, a vehicle may either generate an alternative route or switch to the manual driving mode. Road conditions may be too challenging for 2WD vehicles, for example, if snow depth is too high, whereas a 4WD vehicle may continue driving safely. In this case, 2WD vehicles may find an alternate route. Other on-board systems that enable a vehicle to drive in more challenging conditions are ASR (anti slip regulation) and ESC (electronic stability control) systems.

Figure 10:
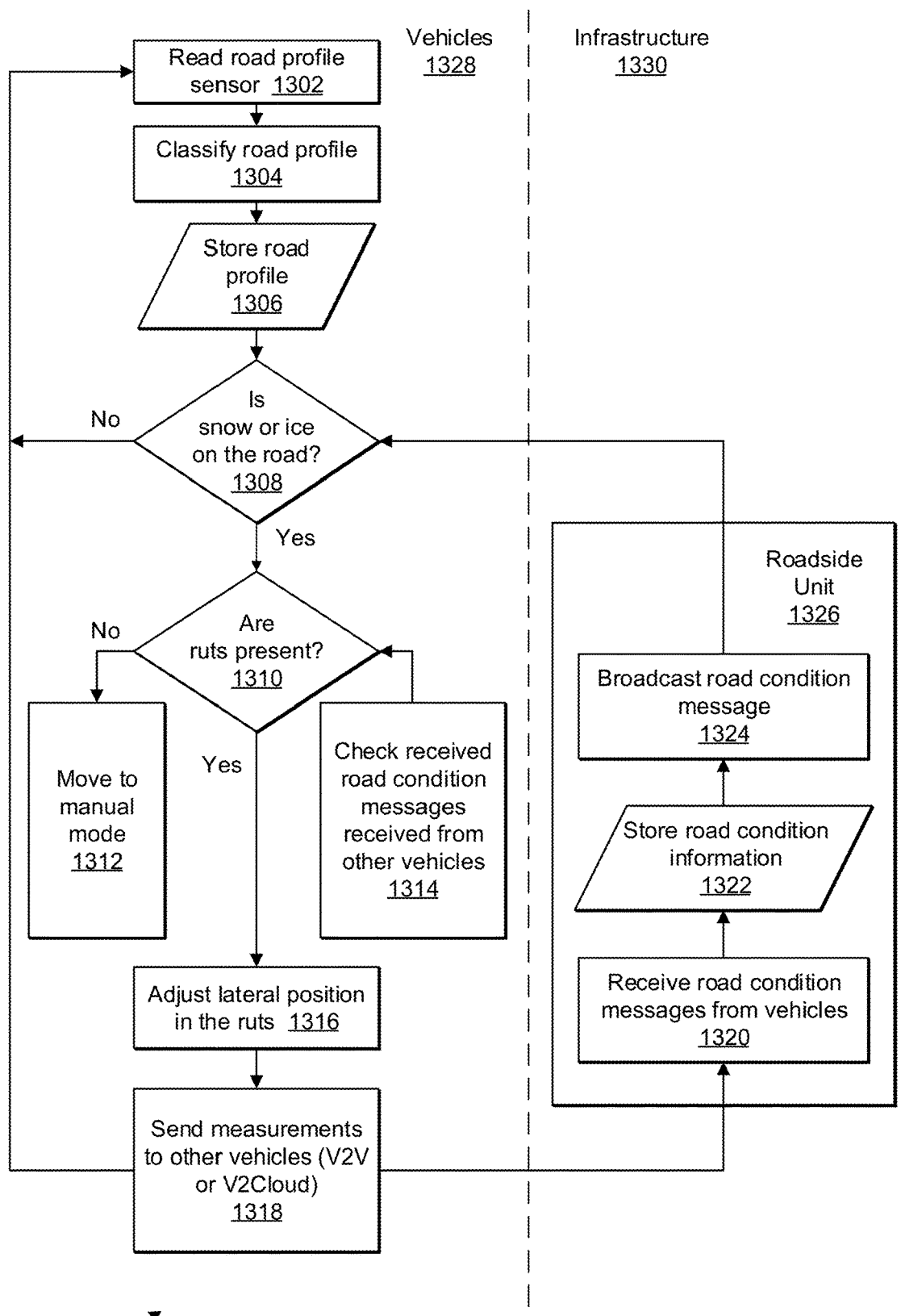
FIG. 10 is a flowchart for determining lateral lane position in snow/ice using roadside unit data.

FIG. 10 is a flowchart 1300 of a risk analysis process for driving in snowy conditions using a cloud server and infrastructure connections. The flowchart 1300 shows an exemplary embodiment for an autonomous vehicle to select a safe trajectory. The flowchart 1300 is divided into two sections: vehicle tasks 1328 are shown to the left of the dashed line, while infrastructure tasks 1330 are shown to the right of the dashed line. A vehicle reads 1302 a road profile sensor and uses that sensor data to classify 1304 and store 1306 in memory a road profile. Using road condition information from a roadside unit, the vehicle determines 1308 if there is snow or ice on the road. If no ice or snow is present, the process goes to the top of the flowchart where the vehicle reads 1302 a road profile sensor. If ice or snow is present, the vehicle determines 1310 if ruts (or tracks) are present in the road after checking 1314 for received road condition messages from other vehicles. If no ruts are present, the vehicle shifts 1312 to manual mode. If ruts are present, the vehicle adjusts 1316 the lateral lane position to be in the ruts. The vehicle sends 1318 sensor measurements to other vehicles and to roadside units, which may be sent by V2V or V2Cloud communications. The vehicle goes to the top of the flowchart to read 1302 a road profile sensor.

Road condition information may be received 1320 and stored 1322 in memory within a roadside unit 1326. The roadside unit 1326 broadcasts 1324 a road condition message to vehicles. For some embodiments, those messages may be to nearby vehicles. This broadcast message may be used by vehicles to determine if there is snow or ice of the road. If a roadside unit receives road condition messages from a vehicle, the roadside unit stores the road condition information to memory and broadcasts another road condition message.

Figure 11:
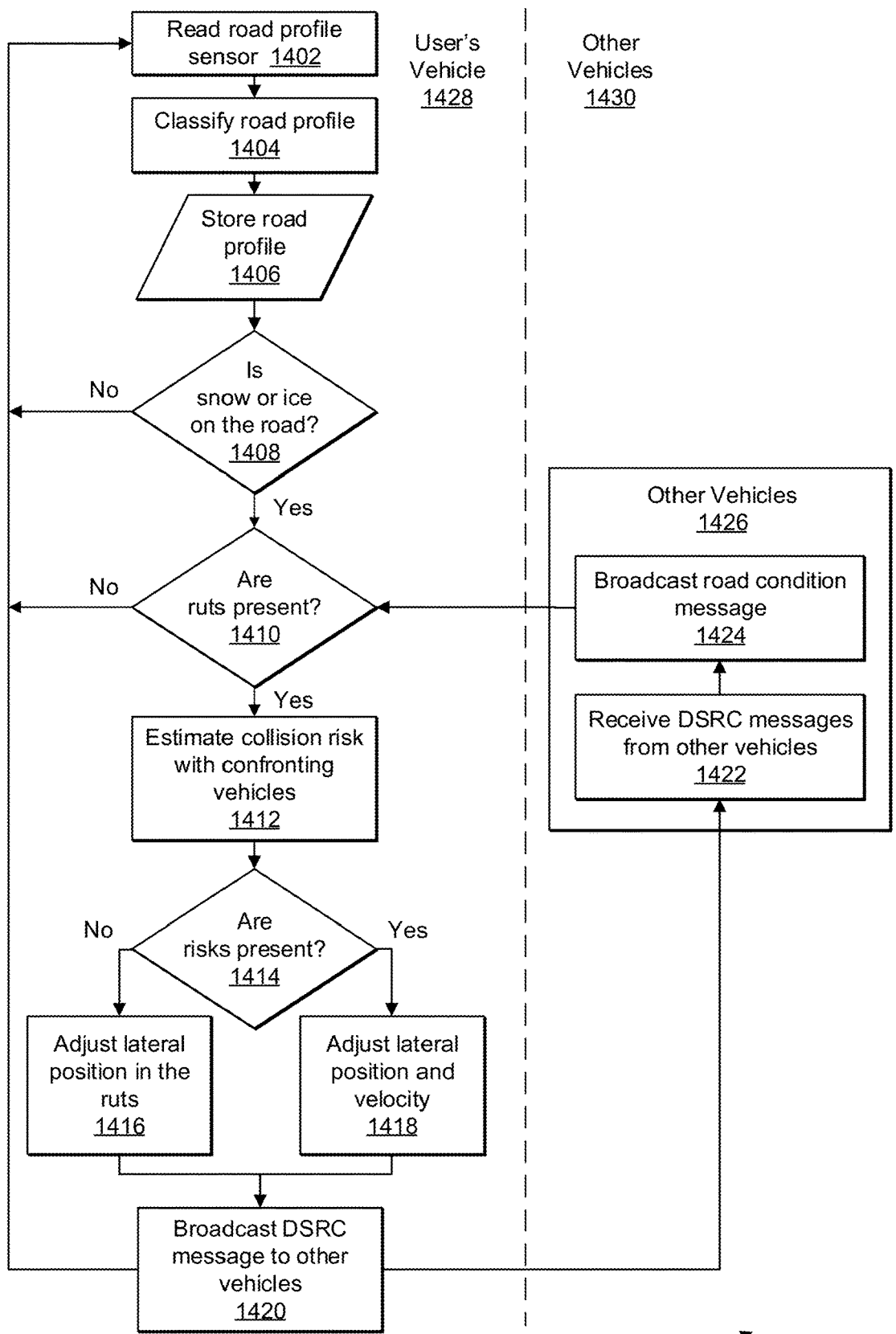
FIG. 11 is a flowchart of a process for determining lateral lane position in snow/ice using other vehicle data.

FIG. 11 is a flowchart 1400 of a risk analysis process for determining a safe lateral position of an autonomous vehicle on a snowy road using V2V messages from other vehicles. FIG. 11 is similar to FIG. 10, except that FIG. 11 shows interactions with other vehicles 1426 instead of with roadside units 1320. The flowchart 140 has a virtual dividing line between tasks done by the user's vehicle 1428 and by other vehicles 1430. At the top of the mainline of tasks, the user's vehicle 1428 reads 1402 a road profile sensor and uses the sensor readings to classify 1404 and store 1406 a road profile. The user's vehicle 1428 determines 1408 if there is snow or ice on the road. If no, the process goes to the top of the flowchart to read 1402 the road profile sensor. If yes, the vehicle determines 1410 if ruts are present on the road. This determination may use Dedicated Short Range Communications (DSRC) messages received from other vehicles 1430. If ruts are not present, the process goes to the top of the flowchart to read 1402 the road profile sensor. If ruts are present, the user's vehicle estimates 1412 collision risk with confronting vehicles. The vehicle determines 1414 if a risk is present. If yes, the vehicle adjusts 1416 the lateral position and velocity to reduce the risk. If no, the vehicle adjusts 1418 the lateral lane position to position the vehicle in the ruts. Both branches of the decision box combine to broadcast 1420 a DSRC message to other vehicles. The host vehicle's process goes to the top of the flowchart to read 1402 the road profile sensor.

If the user's vehicle 1428 or a second vehicle sends a DSRC message to a third vehicle 1426, the message may be received 1422 and stored in memory by the third vehicle 1426. The third vehicle 1426 may also broadcast 1424 DSRC messages to vehicles for those vehicles to use in determining whether ruts are present on the road.

In exemplary embodiments, connected vehicles may be capable of sensing road conditions broadcast appropriate message to other vehicles. A weather service provider may provide local weather data and short term weather history based on location coordinates. A road authority or other service provider may maintain a road condition database and may be capable of sending responses to queries of road condition at certain location. The user's vehicle is equipped with sensors that may measure a road's profile and classify a road's surface.

FIG. 11's risk analysis process contains several sub-processes. During an activation process, the application is active when a vehicle is moving. The vehicle application reads sensor data at regular intervals.

For a weather data query, the vehicle application sends a query at regular intervals to a weather service backend service. A query includes location information, road segment and time interval for requested weather history. A backend service response includes current weather conditions (such as temperature, rain, and humidity) and history data for the same content over a specified number of hours. When road side units are the main information source, weather message broadcasts may be sent without a query message.

For a road condition query, the vehicle application may send a query at regular intervals to road condition management services to retrieve historical information of stored road conditions (such as wear and condition of the road surface). A query contains location information, e.g. identifying a road segment. Optionally, a query may contain measured data from a vehicle sensor system to a road condition management service (floating car data). A response contains stored road condition information. When road side units are used, road condition data is received via road condition message broadcasts and query messages may or may not be used.

For a road condition message broadcast, a host vehicle receives broadcasts of the road condition message from other vehicles or from a roadside unit via a DSRC system. Based on position coordinates and heading of the other vehicle, a host vehicle determines if a received message is relevant for a risk analysis. Other messages are ignored.

A host vehicle's risk assessment is based on sensor readings, which are confirmed with weather data and road condition messages from infrastructure, together with broadcasts from vehicles driving ahead. For some embodiments, risk assessment may be calculated based on road profile measurements, road surface conditions, the presence of water in ruts, and weather reports. A route segment road information set may comprise measurements of a road profile for the route segment, classification of road surface conditions for the route segment, and presence of water in ruts for the route segment. Analyses performed by other vehicles are used to determine a lateral risk profile. This profile is used to adjust a vehicle's trajectory to lower the risk. A vehicle's speed is adjusted based on the driving maneuvers to be performed. A calculated risk assessment and lateral lane position adjustment may be communicated to a backend server.

Figure 14:
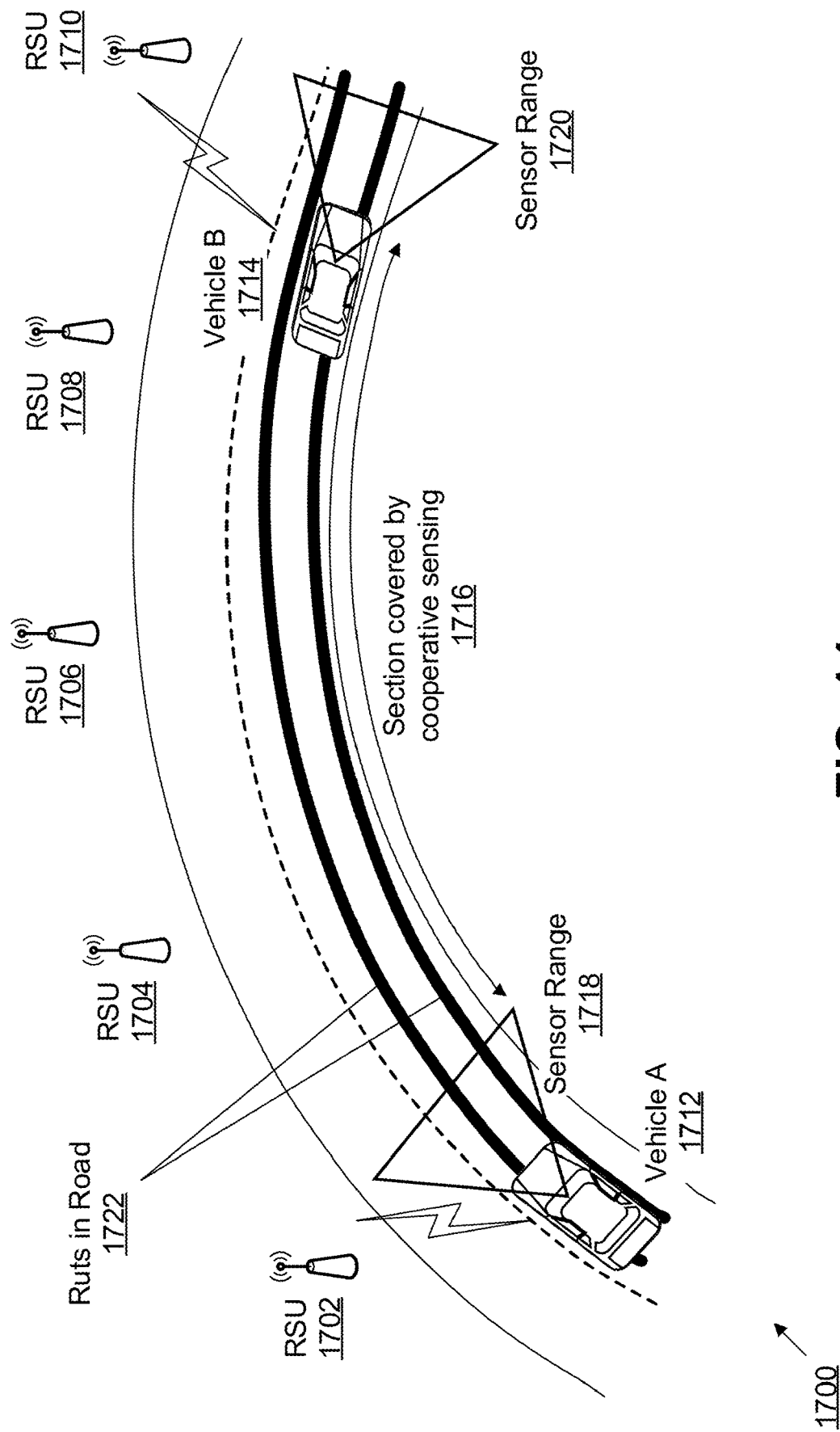
FIG. 14 is a schematic plan view of a risk assessment scenario involving another vehicle.

A risk analysis may use some of the following principles. A host vehicle does not re-use decisions calculated by another vehicle (due to different vehicle dimensions and positioning errors), but measurements may be re-used for calculating future actions (co-operative sensing). A car driving ahead may provide information on a road's condition for a longer distance than the sensors of the user's vehicle. Therefore, a trajectory may be planned using greater distance data. Road conditions are not steady and may vary a lot in a short range. In FIG. 14, vehicle A 1712 is driving on the left side of the ruts, and vehicle B 1714 is on the right side. Based on the measurements sent via Intelligent Transportation Systems, 5.9 GHz (ITS-G5), vehicle A 1712 may make the decision to stay on the left side because ruts are closing off the right side of the lane and the best trajectory is on the left. Another potential problem is that a rain sensor may detect only the current rain. A weather service information or local roadside unit weather station may provide information from the past. Also, a risk profile is constructed using an appropriate reasoning engine (such as fuzzy or neural network) by taking account of all relevant information. Information from other sources may or may not be used, but such information may improve performance. Also, a risk analysis may show that a planned route is too risky and an alternative route may be selected. This condition may occur when a vehicle has been equipped with summer tires and road condition messages show an icy and slippery road section. A vehicle's capabilities, such as AV sensor configuration, AV sensor capabilities, 2-wheel/4-wheel drive, and vehicle dimensions influence a risk analysis as well.

For a position and velocity adjustment 1418, a vehicle sends a trajectory correction message to the vehicle lateral control system and to the velocity controller. This message 1418 is shown near the bottom of FIG. 11.

For a message broadcast 1420, a message is filled with data and sent to other vehicles with a message frequency of 1 Hz. Such a message 1420 is shown at the bottom of FIG. 11.

Figure 12:
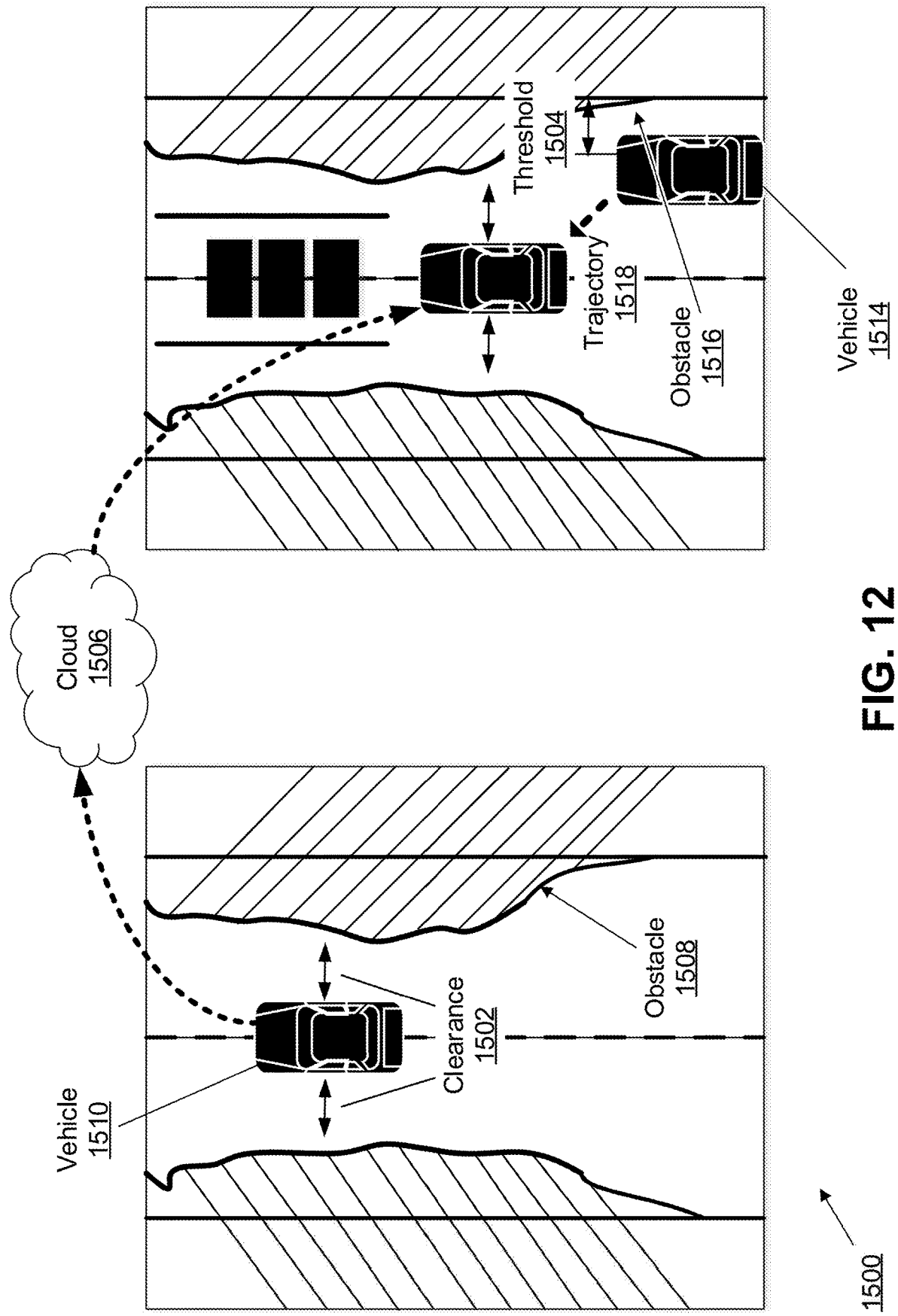
FIG. 12 provides schematic plan views illustrating a vehicle under conditions of lane size reduction due to snow covered roads.

FIG. 12 is a plan view schematic of an obstacle scenario 1500 for reporting to a cloud server 1506 a partially blocked lane or road due to snow covered roads. FIG. 12 shows the reporting and use of dynamic lane (rut) information and adjustments made to a vehicle's lane/rut offset. When a vehicle detects an obstacle 1508 in the road, such as a construction cone or a snow pile bank at the edge of the road, and the obstacle is laterally displaced more than a threshold distance 1504 from the road side, the vehicle determines whether to request a dynamic map layer from the server. A first vehicle 1510, such as a snow plow, clears a lane in a road. The first vehicle 1510 reports that the route segment's obstacle is disrupted and reports the distance from the edge of the clearance to the road side. The clearance values 1502 may be reported using distance measuring sensors mounted on the sides of the first vehicle (for example, RADAR, LIDAR, or SONAR sensors).

When a second vehicle 1514 approaches a road segment and determines that an obstacle 1516 is in the road using a perception sensor, the second vehicle determines if the obstacle is more than a threshold distance away from the road side. If such a condition is determined to be true, the second vehicle requests clearance information from a cloud server 1506. If clearance information is available, the second vehicle 1514 follows a trajectory 1518 communicated to the second vehicle 1514 by the cloud server 1506. If the cloud server 1506 does not have information for the disrupted segment, the second vehicle 1514 may indicate to the user to move to manual mode.

Figure 13:
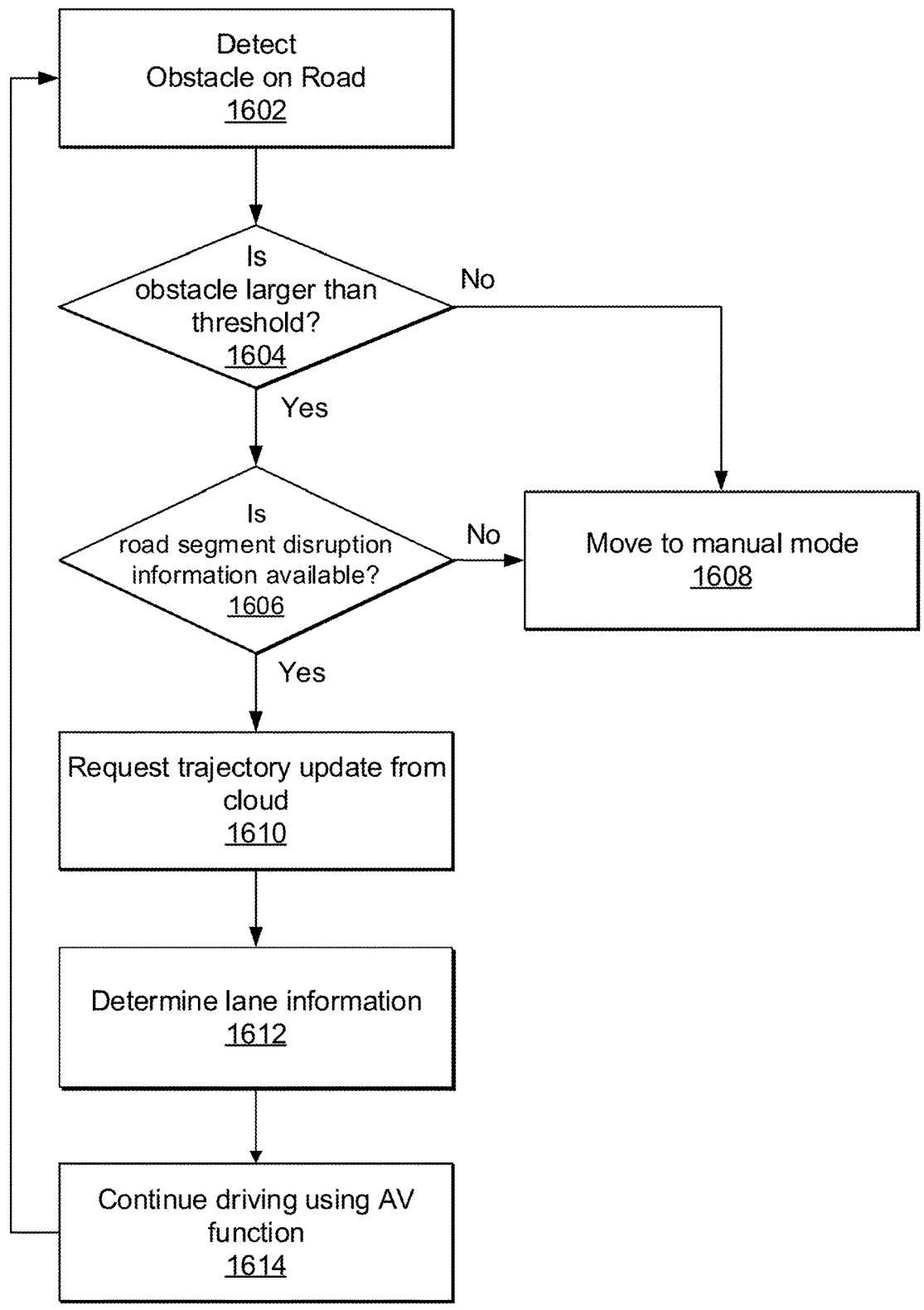
FIG. 13 is a flowchart of a process for a vehicle to request lane information to determine if an obstacle is blocking a lane.

FIG. 13 is a flowchart 1600 of a process for a vehicle to request lane information to determine if an obstacle is blocking a lane. This flowchart 1600 may be used in a circumstance such as that illustrated in FIG. 12. A vehicle detects 1602 an obstacle in the road. If the obstacle is not larger than a threshold 1604, the vehicle moves to manual mode 1608. If the obstacle is larger than a threshold, the vehicle determines if road segment disruption information is available from a cloud server or other sources 1606. Such information may include information about traction control. If no road segment disruption information is available, the vehicle switches to manual mode 1608. If road segment disruption information is available 1606, the vehicle requests a trajectory update from a cloud server 1610. The vehicle determines lane offset information 1612 and continues driving via the AV function 1614 while using updated lane offset calculations.

FIG. 14 is a schematic plan view 1700 of a risk assessment scenario involving another vehicle. FIG. 14 shows vehicles driving in warmer weather where there are ruts in the road. Vehicle A 1712 is driving to the left of the ruts while coming around a curve. Vehicle B 1714 is a little ahead of vehicle A 1712 and has recorded data regarding the paths of the ruts. Vehicle B 1714 sends wireless communication messages to roadside units (RSU) located near the curve. The RSUs 1702, 1704, 1706, 1708, 1710 receive these messages from vehicle A 1712 and broadcast rut information messages to passing vehicles. Vehicle A 1712 receives a broadcast message from an RSU 1702, 1704, 1706, 1708, 1710 and continues driving to the left of the ruts. In this example, vehicle B 1714 reports that the ruts move toward the right edge of the lane, thereby leaving no room for a vehicle to travel to the right of the ruts 1722 and still remain within the lane. Vehicle A 1712 uses cooperative sensing from vehicle B's sensor reports to determine the upcoming section's rut trajectory for a road section covered by cooperative sensing 1716. Vehicles A 1712 and vehicle B 1714 have sensor detection ranges 1718, 1720.

Figure 15:
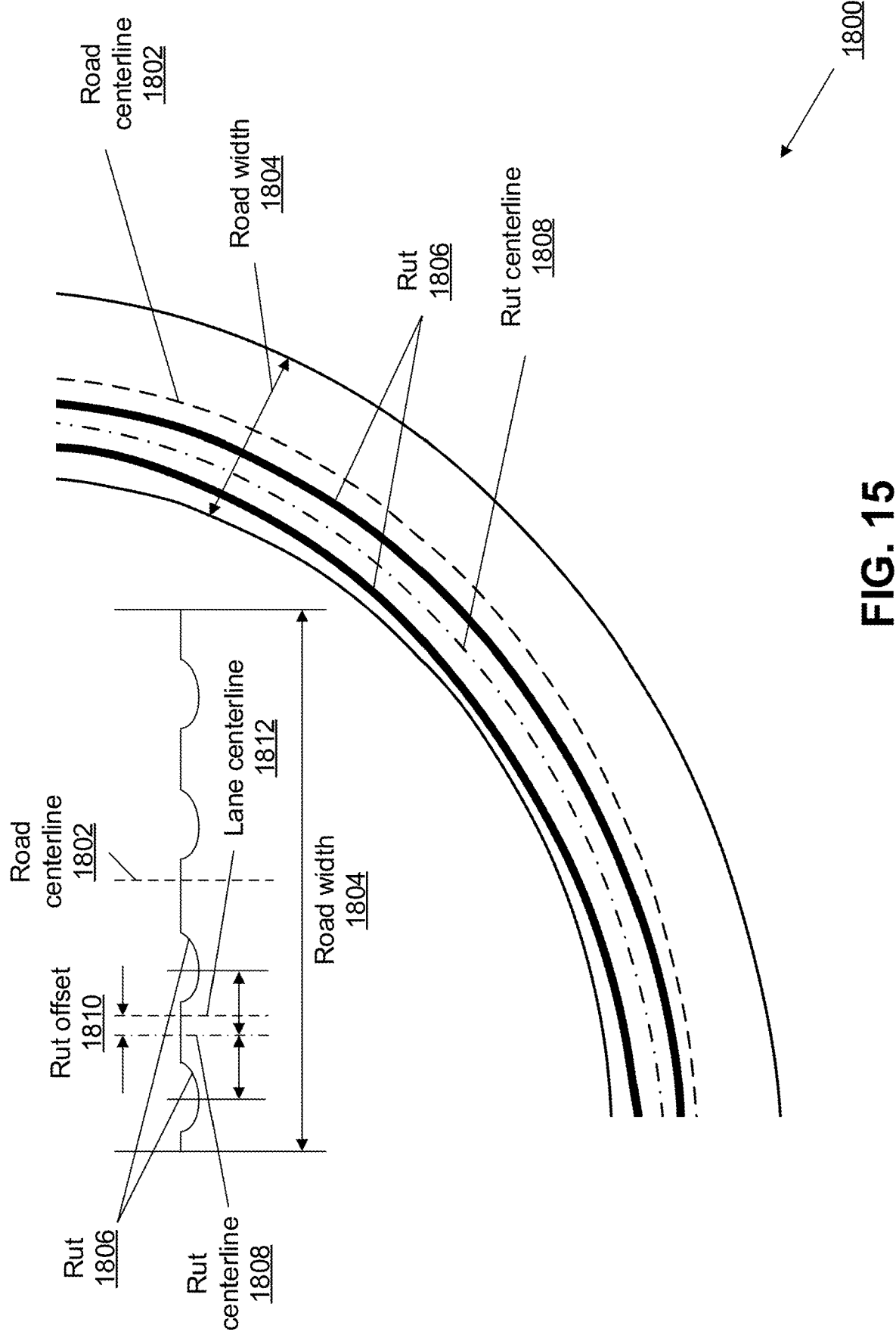
FIG. 15 is a schematic plan view of lane/rut offset calculations related to aquaplaning.

FIG. 15 is a schematic plan view 1800 of lane and rut offset 1810 calculations related to aquaplaning. Current weather data and recent historical weather data (from the present to a few hours or days back) indicates that ruts 1806 may contain water or that there is snow on the road. If the road has been dry for a long time, the probability is very low that water is on the road. However, during spring time, when the sun is melting snow and ice, there are situations when water is present even though rain has not fallen for a while. If rain is heavy, vehicle sensors may be unable to measure a road profile determine the presence of ruts 1806 for a road segment. In these situations, confirmation of ruts may be received from a road condition management service.

If a vehicle's lateral position in the lane changes from left to right or vice versa (such as to take the next exit on a highway) and pass through the ruts 1806, vehicle speed may be lowered while driving through the ruts 1806 in summertime. Slush and snow between the ruts 1806 may cause a risk when a vehicle's trajectory is changed. The location of ruts 1806 may be measured by calculating a mean of the rut distances (rut centerline 1808) from the lane centerline 1812, as shown in FIG. 15. A road database may contain a road's centerline geometry 1802, road centerline 1802, road width 1804, and road class. FIG. 15 shows how rut location may be measured from the lane centerline 1808. Rut offset 1810 is the difference between the rut centerline 1808 and the lane centerline 1812.

Figure 16:
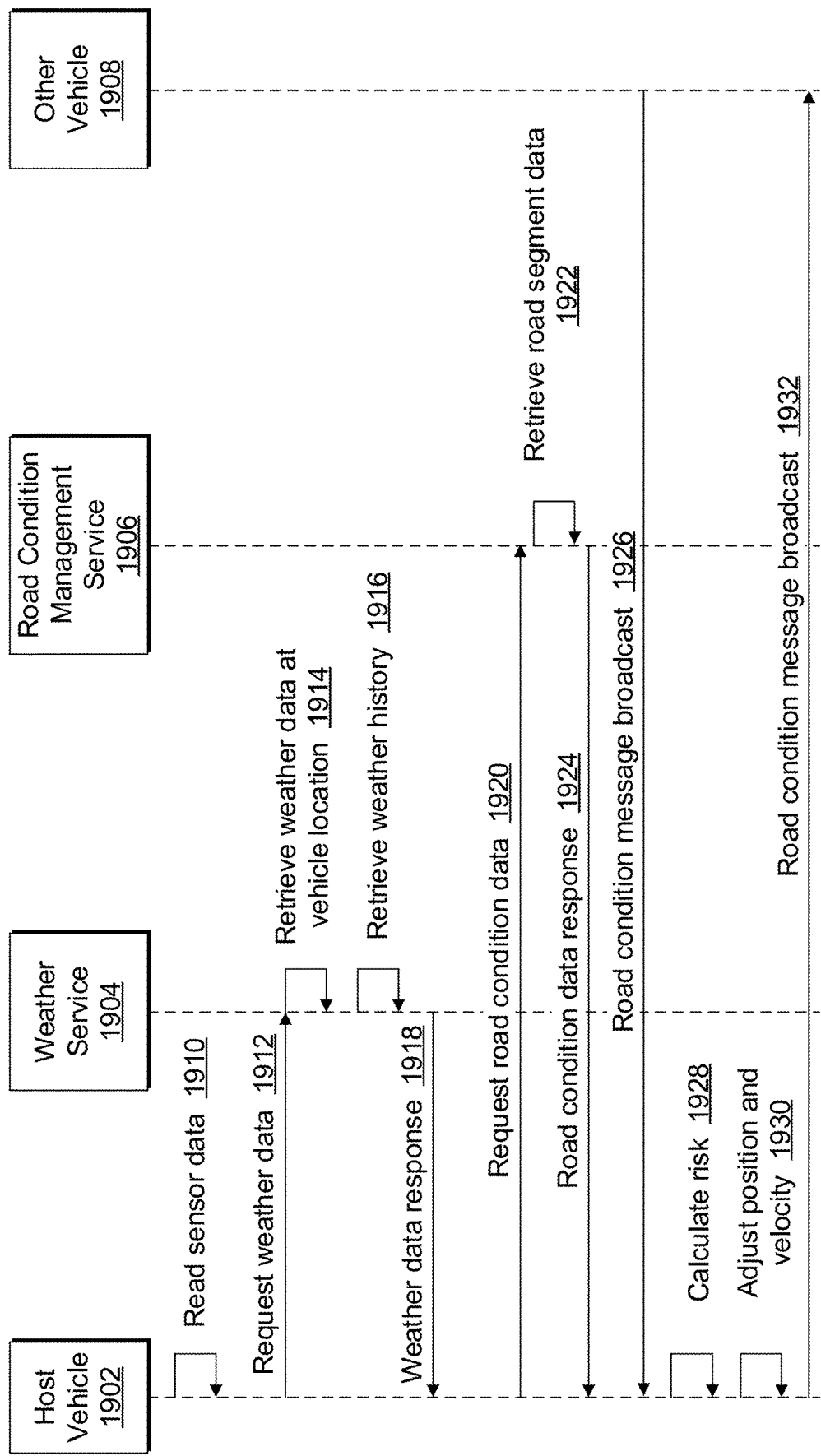
FIG. 16 is a message sequence diagram for using cloud services to determine a road's condition.

FIG. 16 is a message sequence diagram 1900 for using cloud services to determine a road's condition. A host vehicle 1902 reads sensor data 1910 for sensors attached to the vehicle. The host vehicle 1902 requests weather data 1912 from a weather service 1904. The weather service 1904 retrieves weather data from the weather service's database storage 1914 for the host vehicle's location. The weather service also retrieves recent historical weather data 1916 from the weather service's database for the host vehicle's location. The weather service 1904 sends a weather data response 1918 to the host vehicle 1902. The host vehicle 1902 sends a road condition data request 1920 to a road condition management service 1906. The road condition management service 1906 retrieves from a database road condition data for the host vehicle's road segment 1922. The road condition management service 1906 sends a road condition data response message 1924 to the host vehicle 1902. Also, one or more other vehicles 1908 broadcast road condition messages 1926 to the host vehicle 1902. The host vehicle 1902 calculates a risk assessment 1928 and adjusts the lane position and vehicle velocity 1930 accordingly. The host vehicle 1902 broadcasts an updated road condition message 1932 to other vehicles 1908.

Figure 17:
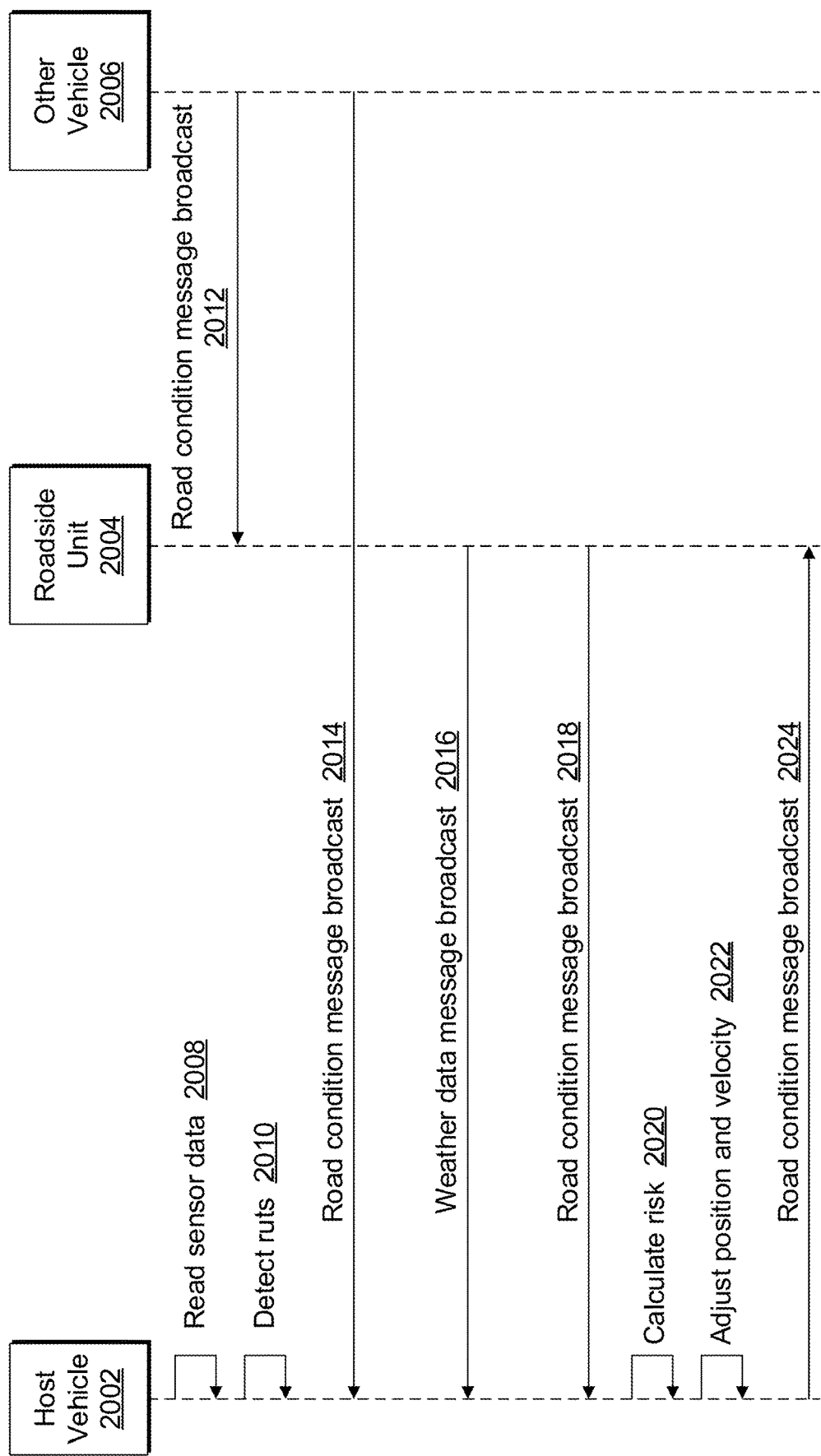
FIG. 17 is a message sequence diagram for using roadside units to determine a road's condition.

FIG. 17 is a message sequence diagram 2000 for using roadside units to determine a road's condition. The host vehicle 2002 reads sensor data 2008 for sensors attached to the host vehicle 2002. The host vehicle 2002 detects ruts in the road 2010. One or more other vehicles 2006 broadcast road condition messages 2012, 2014. These messages 2012, 2014 are received by roadside units 2004 and the host vehicle 2002. A roadside unit 2004 broadcasts a weather data message 2016 that contains weather information to a host vehicle 2002. The host vehicle 2002 also receives a road condition message broadcast 2018 from a roadside unit 2004. The host vehicle 2002 calculates risk assessment 2020 and adjusts the lane position and vehicle velocity 2022 accordingly. The host vehicle 2002 broadcasts a road condition message 2024 to one or more roadside units 2004. For some embodiments, a road condition message 2024 may contain the AV functions used for a particular road segment.

Figure 19:
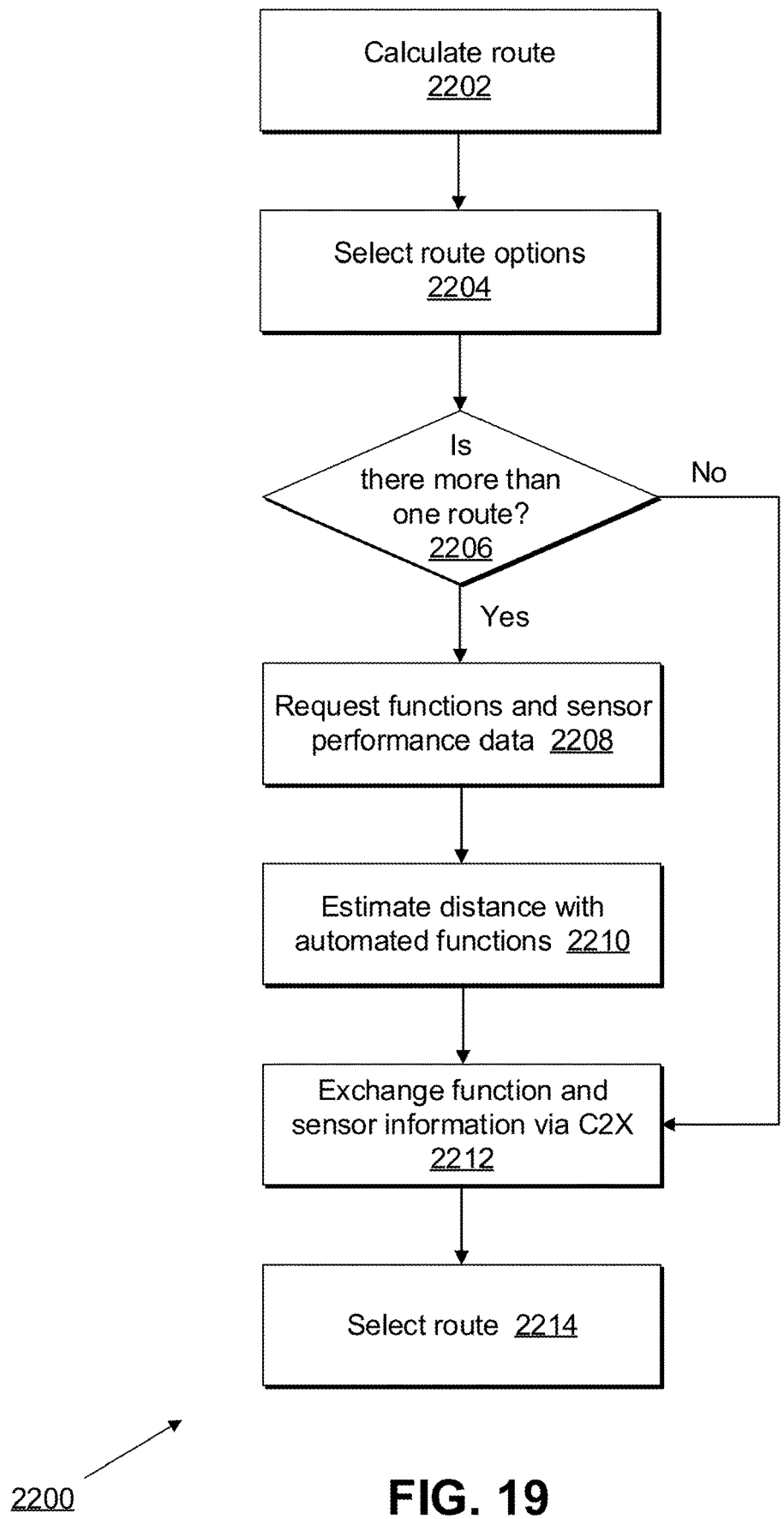
FIG. 19 is a flowchart of a vehicle route selection procedure.
Figure 20:
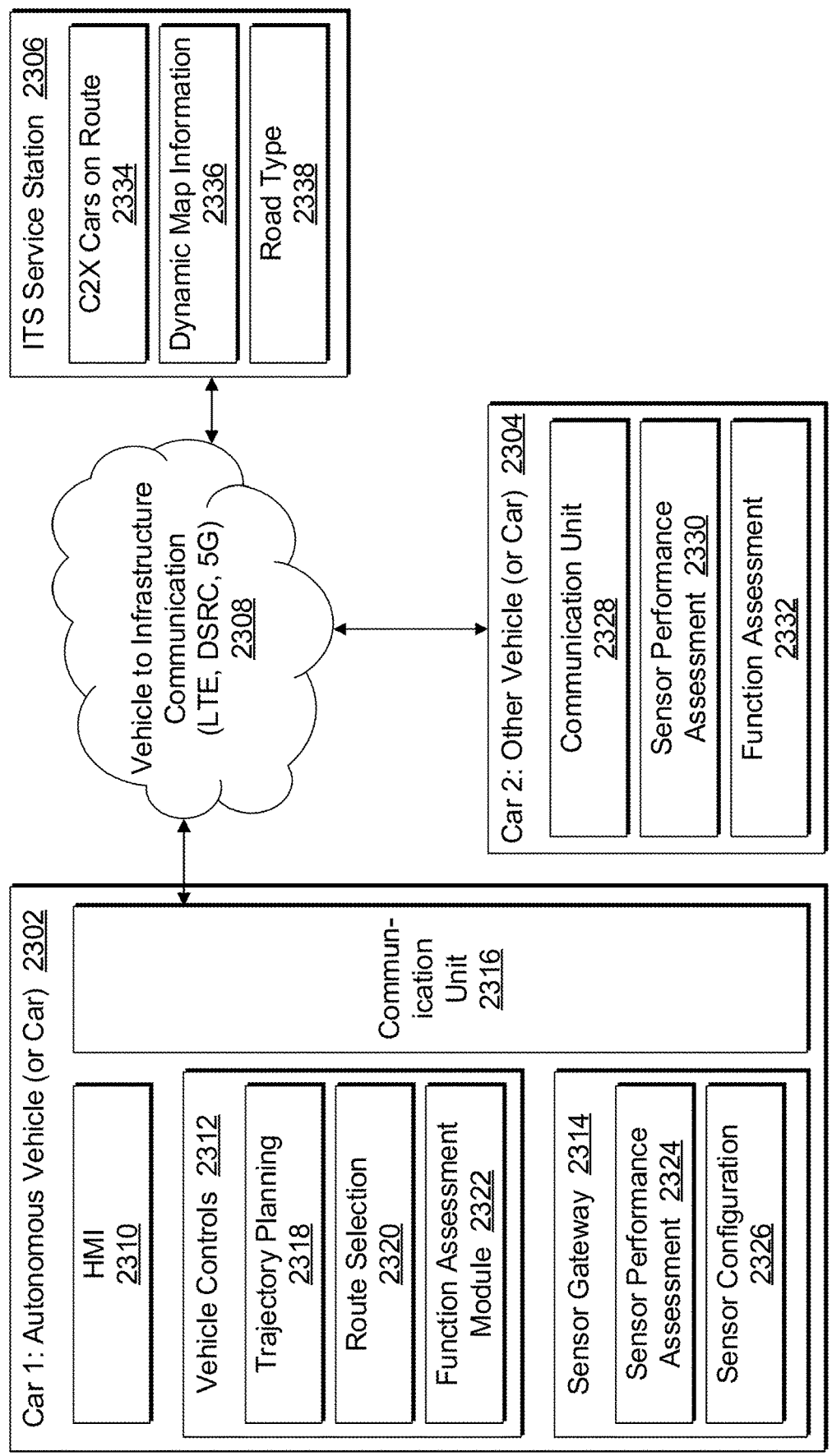
FIG. 20 is an architecture diagram of a system for optimizing route planning for an autonomous vehicle.

FIGS. 19 and 20 both show road condition messages 1924, 1926, 1932, 2012, 2014, 2018, 2024 sent between vehicles 1902, 1908, 2002, 2006 to a cloud server (such as a road condition management service 1906), or to a roadside unit 2004. Such messages 1924, 1926, 1932, 2012, 2014, 2018, 2024 may be broadcast at a rate of 1 Hz (once every second). Road condition messages 1924, 1926, 1932, 2012, 2014, 2018, 2024 may contain the following fields: latitude heading (μ degrees), longitude heading (μ degrees), speed (m/s or miles/hour), compass heading (degrees), road segment identification number, lane identification number, skid prevention system status (active/not active), presence of ruts (true/false), lateral lane position adjusted (true/false), driving in the ruts (true/false), driving outside the ruts (true/false), rut depth (cm or inches), rut offset from lane centerline (cm or inches), vehicle width (cm or inches), tire type (winter/friction [all weather]/summer), and tire condition indicator (% of remaining tread).

Segment change messages may be sent to a host vehicle just before entering a new segment. A segment change message sent by a road maintenance service contains the following fields: road segment identification number, lane identification number, lane offset (cm or inches), and road wear percentage (0%=new, 100%=road wear repair limit).

Weather service messages 1918 may be sent by a weather service 1904 at a rate of 0.1 Hz (once every 10 seconds). A weather service message 1918 may include temperature (degrees), humidity (%), dew point (degrees), and precipitation (mm/h).

Figure 18:
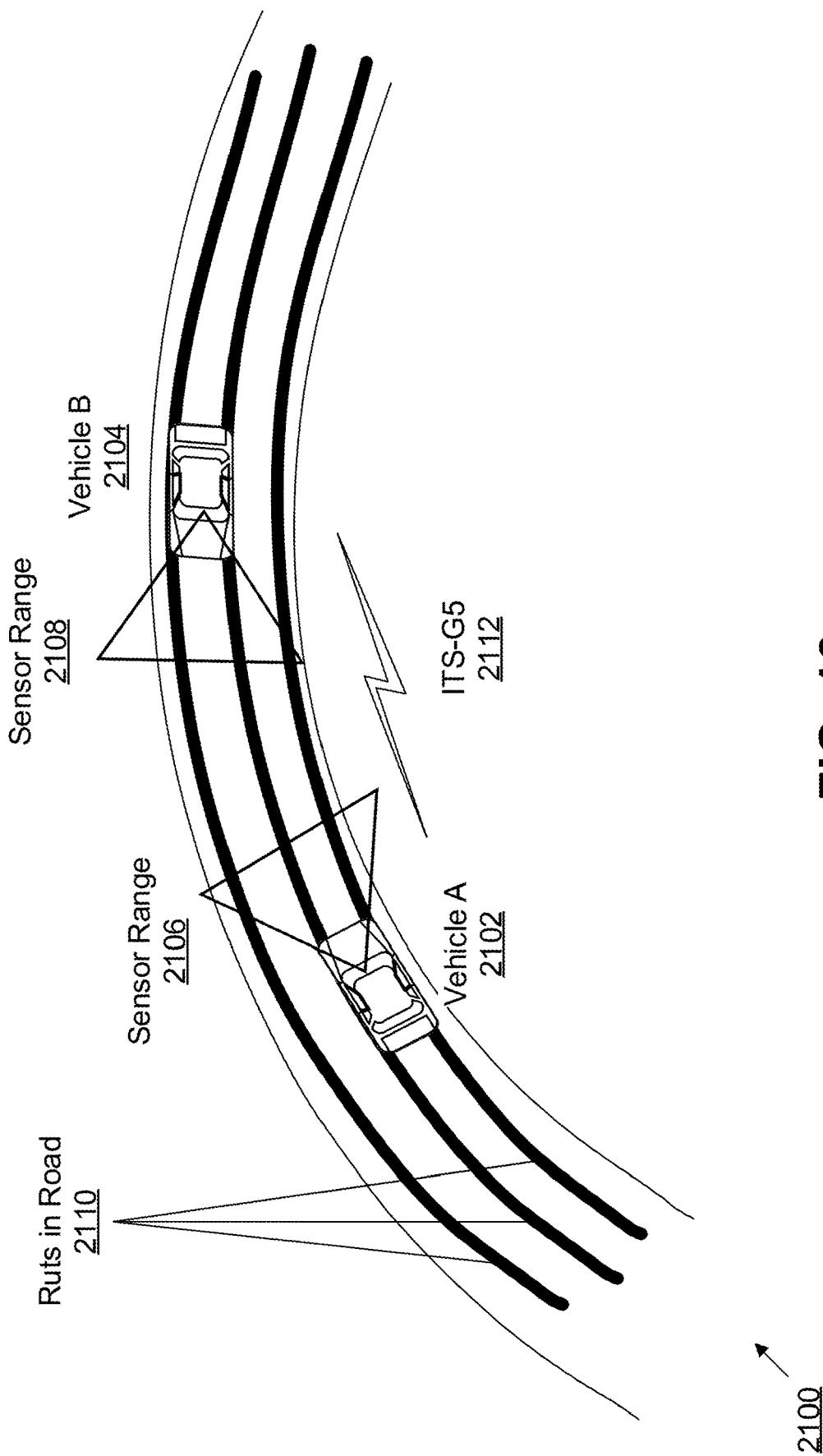
FIG. 18 is a schematic plan view for a situation in which there are only three ruts in which to drive for two-directional traffic.

FIG. 18 is a plan view schematic 2100 for a situation in which there are only three ruts 2110 in which to drive for two-directional traffic. Sometimes in the winter there are only three ruts 2110 in which to drive, such as on narrow roads. When two vehicles 2102, 2104 approach each other in a road with three ruts 2110, the vehicles 2102, 2104 will determine how to bypass safely. Vehicle A has a sensor range 2106 and vehicle B has a sensor range 2108 for vehicle sensors that may be used to determine the presence of only three ruts 2110 on a two-lane road and the presence of an on-coming vehicle 2102, 2104. Communication (V2V) 2112 between vehicles 2102, 2104 may be used to determine how and when to adjust speed and change a lateral driving path.

Messages sent via DSRC (road condition messages) contain information about vehicle position, speed, and lateral offset in the lane. Based on this information, a vehicle may estimate a risk of collision in the near future. An example of a risk estimation algorithm used in some embodiments is described in M. Hyvonen et al., *Assistive Situation Awareness System for Mobile Multimachine Work Environments*, IEEE TRANSACTIONS ON INTELLIGENT TRANSPORTATION SYSTEMS 1-11 (vol. PP, no. 99) (doi: 10.1109/TITS.2015.2453208). When a risk of collision with confronting traffic is detected, a vehicle may slow down and adjust its lateral position to prevent collision. For such an embodiment, a rut offset algorithm is not used.

Sometimes snow covers all lane markings. Passing cars provide road condition messages to roadside units as well as other vehicles. A rut offset may be estimated using statistical methods from gathered trajectories and broadcasted to passing vehicles. Accurate positioning and map data is used to operate autonomous cars in such conditions.

An exemplary embodiment uses static and dynamic road, weather, and vehicle probe data (e.g., used automated functions and sensors) gathered to the system for calculating the most suitable route for automated driving. The road profile (such as edges and potholes) is one parameter and other exchanged information concerns automated functions (or expected support for AV functions) used in the road segments. The V2X communication is used to exchange data between backend Intelligent Transportation Systems (ITS) service stations and vehicles for delivering which sensors and automated functions were used in a road segment. This enables calculation of the percentage of automated driving functions used for different route options. Also, estimates of percentage of automated function use may be calculated for different route options. For one embodiment, expected-AV-drivability data for a route segment includes information regarding one or more of the following items: a road profile (such as locations of ruts and potholes) for a route segment, actual road conditions as gathered by other vehicles, weather-forecast data, expected support for AV functions of a route segment, actual sensor performance as measured by other vehicles, AV-sensor-system performance-forecast data, and a percentage or distance of a route segment supported by one or more AV functions. Actual sensor performance may include information regarding an effective range of at least one sensor on the route segment, such as effective range of a LIDAR or RADAR. AV functions may comprise intersection assistance, lane keeping, highway pilot, overtaking assistance, stop & go assistance, and platooning. Expected AV drivability for a route segment may also include information regarding road width, road type, and visibility of lane markings.

FIG. 19 is a flowchart 2200 of a vehicle route selection procedure. At the top of the flowchart 2200, the route selection process receives a message from vehicle systems to calculate one or more routes 2202 that maximize the ability to use automated functions and to have valid sensor data available. Based on map data, route options are selected 2204 for going from a starting point and a destination point. The process determines if there is more than one route option 2206. If there is only one route option, the process goes to the bottom of the flowchart 2200 to exchange AV function and sensor information via Car-to-X (C2X) communications 2212. If there is more than one route option, the process sends a message request 2208 to a backend ITS service station for AV functions, AV-related sensor capabilities, and sensor performance data for other vehicles. Sensor performance data comprises sensor performance estimations, sensor mounting positions, and failed AV functions (or AV operations that were disrupted). For some embodiments sensor performance data also comprises information regarding AV sensor usage for each vehicle that traversed a route option and information regarding AV sensor disruptions while traversing the route segment for each vehicle. For each route, the process estimates how many automated functions may be used (or expected vehicle autonomous drivability or expected support for autonomous vehicle functions) and a distance (or percentage of each route option) each automated function may be used 2210. Such estimates are based on the existing sensor setup (such as cameras, radar systems, and LIDAR systems) and sensor mounting positions. For some embodiments, a host vehicle may determine that the host vehicle lacks sufficient vehicle sensor capabilities to autonomously drive a route option. The process re-joins with the only one route flowchart path and the process exchanges function and sensor information via C2X communications. Such messages comprise which automated functions failed for each route segment as well as sensor performance data. At the bottom of the flowchart 2200, the vehicle selects 2214 the optimal route and records the selected route. For some embodiments, the selection is made on the basis of support for AV functions. Selection may also be made on the basis of a host vehicle having sensor capabilities and sensor performance that correspond to other vehicles that have successfully traversed a route. For some embodiments, the host vehicle substantially follows (or traverses) the selected route.

FIG. 20 is an architecture diagram 2300 of the system for optimizing route planning for an autonomous vehicle. The diagram shows the interaction of four entities: an autonomous vehicle 2302, another vehicle 2304, an ITS service station 2306, and vehicle infrastructure communication (e.g., LTE, DSRC, or 5G) 2308.

For FIG. 20, the autonomous vehicle 2302 has four functional blocks: a human-machine interface (HMI) 2310, vehicle controls 2312, a sensor gateway 2314, and a communications unit 2316. Via the HMI 2310, the user of an AV sets the destination point of a journey. For some embodiments, this block 2310 is not used. Vehicle controls 2312 is the unit that sends vehicle control commands to actuator devices. Three types of vehicle control modules are: trajectory planning 2318, route selection 2320, and function assessment module 2322. Trajectory planning 2318 determines a route segment and correct trajectory for a route. Route selection 2320 is software module for calculating route options and determining which route enables the greatest use of automated functionality. A function assessment module 2322 determines which automated functions will be used for a particular route and how much each automated function may be used (or expected support for AV functionality). A sensor gateway 2314 is a sensor device sub-system. A sensor gateway 2314 may contain two modules: a sensor performance assessment module 2324 and a sensor configuration module 2326. A sensor performance assessment module 2324 assesses performance of available sensors along a route. A sensor configuration module 2326 records sensor parameters used and determines if other sensor parameters may be used along a route. A communication unit 2316 is a gateway between a host vehicle 2302 to backend ITS services and to other vehicles 2304.

A host vehicle's communications unit 2316 connects wirelessly to another entity of FIG. 20: vehicle to infrastructure communication 2308. This same entity 2316 also connects to other vehicles 2304 and to an ITS service station 2306. A host vehicle 2302, other vehicles 2304, and an ITS service station 2306 each may have circuitry for connecting to wireless communication infrastructure and circuitry for making short-range wireless communications with vehicles.

Other vehicles (or cars for some embodiments) 2304 interact with the system and the host vehicle. As far as FIG. 20 concerns other vehicles 2304, there are three functional blocks: a function assessment block 2332, a sensor performance block 2330, and a communications unit 2328. The function assessment block 2332 records the failure of automated functions for particular route segments. The sensor performance block 2330 communicates reports on sensor performance. Like the host vehicle 2302, other vehicles 2304 have a communications unit 2328 that is a gateway from a vehicle 2304 to backend ITS services, the host vehicle 2302, and other vehicles. A host vehicle 2302 may receive identifying information from other vehicles 2304 traversing a route and communicate with other vehicles on a route to obtain information on failed sensors and AV function failures.

An ITS service station is a backend system for delivering route information data (such as sensor performances and automated function failures). Some of the data items that an ITS service station stores are C2X vehicles on a route 2334, dynamic map information 2336, and road type 2338. For C2X vehicles on a route 2334, an ITS service station 2306 stores a database of C2X-equipped cars on a route, including road segment identification codes. The dynamic map information 2336 is information on dynamic variables for a road (such as weather, the presence of animals, road construction, and a variable speed limits). The road type 2338 contains the type of road for a particular road segment (such as highway, urban intersection, gravel, and dirt). A host vehicle (or autonomous car) may communicate, to an ITS service station, AV function performance and sensor performance for a route.

The system accounts for dynamic changes in different routes that may cause problems for AV sensing systems when the system makes route selection calculations. Examples of dynamic constraints are weather conditions and road construction. Exemplary methods operate to select optimal routes for autonomous vehicles and to maximize the automated driving percentage and to minimize the total travel time of available route options. Exemplary methods use collaboration between vehicles via V2X communication and exchanging of information between infrastructure and the vehicles. Vehicles send messages to an ITS service station 2306 if lane markings are visible and fog or blowing snow is present on a road.

Vehicles passing a road segment report to an ITS service station 2306 if a vehicle is unable to drive a road segment using an automated function. The reason for failing to pass the road segment is communicated. For example, the reason may be that the LIDAR system is making unreliable readings due to snow. As a result, the vehicle may not be able to use autonomous functions for that road segment. A report lists the time and position when an autonomous function failed. Other vehicles on the route may respond to message queries with information of sensor setups used to successfully drive a road segment. A vehicle's status report may also provide an estimate of how long a condition has existed (such as how long snow has been falling or when an accident occurred) or will be valid.

Figure 21:
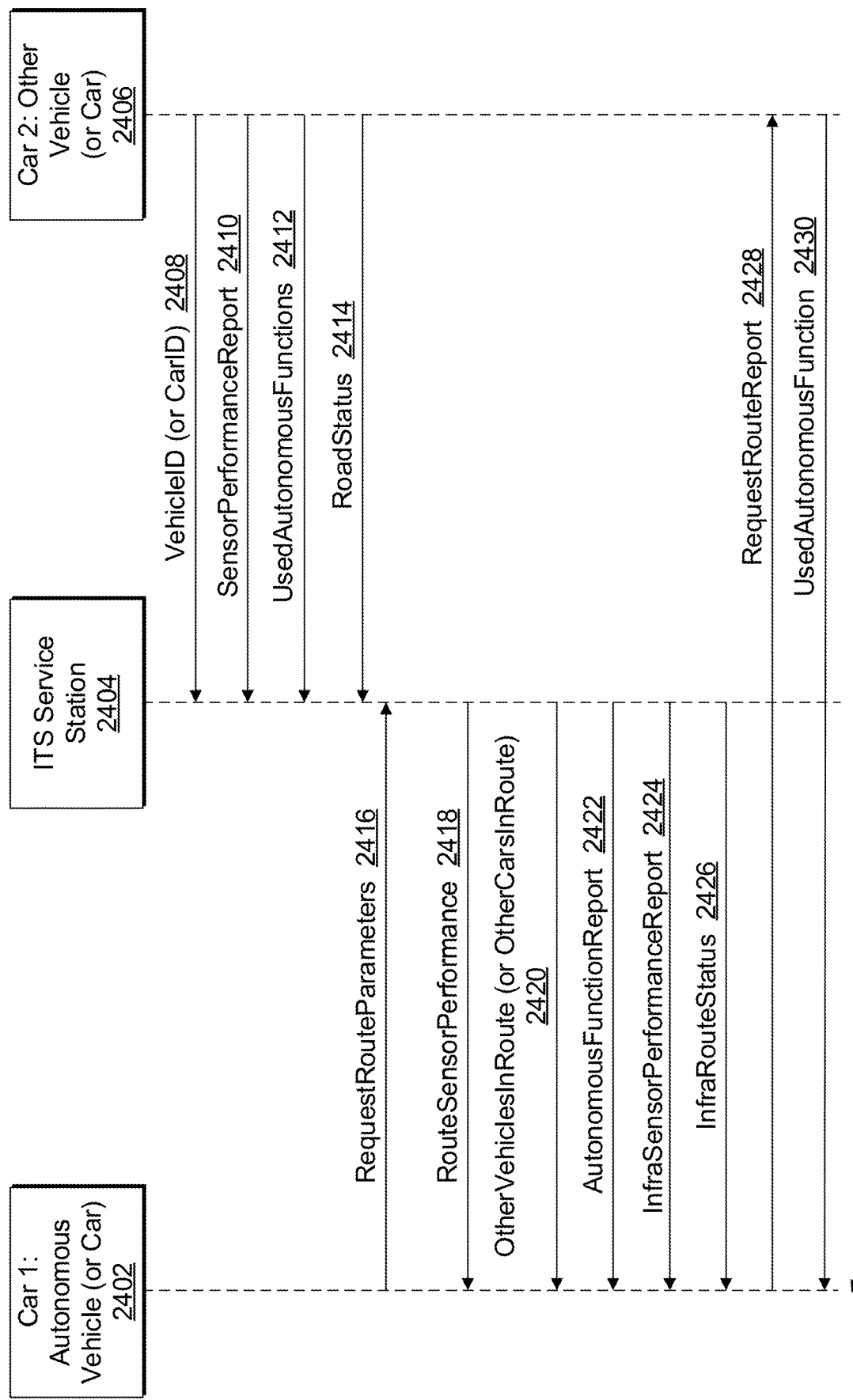
FIG. 21 is a message sequence diagram for collaborative route data.

FIG. 21 is a message sequence diagram 2400 for collaborative route selection. Via the HMI, the user of an AV 2402 sets the destination point of a journey. The vehicle's default setup uses a mode that maximizes automated driving functionality and minimizes travel time. Other vehicles 2406 send the following messages to an ITS Service Station 2404: VehicleID (or CarID) 2408, Sensor Performance Information (or Report) 2410, UsedAutonomousFunctions 2412, and RoadStatus 2414. A host AV 2402 sends a RequestRouteParameters 2416 message to an ITS Service Station 2404, and the ITS Service Station 2404 responds with RouteSensorPerformance 2418, OtherVehiclesInRoute (or OtherCarsInRoute) 2420, AutonomousFunctionReport 2422, InfraSensorPerformanceReport 2424, and InfraRouteStatus 2426 messages. The AV 2402 sends a RequestRouteReport 2428 message to another vehicle 2406, and that vehicle 2406 responds with a UsedAutonomousFunctions 2430 message. For one embodiment, navigation-route data may comprise information enabling an autonomous vehicle to traverse a route segment. For one embodiment, modifying of navigation-route data may comprise selecting a route segment, changing a route segment, or sending information for setting lateral position within a lane or setting a speed of a vehicle.

Exemplary messages and their associated data fields are listed below for one particular embodiments. In different embodiments, analogous messages may be used with different numbers of data fields and/or different information conveyed in those data fields.

An exemplary VehicleID (or CarID) 2408 message contains a VehicleIDNumber field. The VehicleIDNumber field is an identification code of the vehicle sending the message. The VehicleIDNumber field may also be the vehicle's electronic register plate.

An exemplary SensorPerformanceInfo 2410 message contains fourteen fields, which are listed below. The RoadSegmentID field is an identification code for a road segment according to map data. The ShortRangeRadar field is the average effective range of the 24 GHz radars for the road segment. The ShortRangeRadarPosition field is one or more vectors specifying the mounting positions of the short range radars. The LongRangeRadar field is the average effective range of the 77 GHz radars in the road segment. The LongRangeRadarPosition field is one or more vectors specifying the mounting positions of the long range radars. The LIDARType field is the wavelength of the LIDARsensor. The LIDARRange field is the average effective distance range of the LIDARs in the road segment. The LIDARPosition is one or more vectors specifying the mounting positions of LIDAR laser scanners. The VisibleCameraRange field is the average detection range of the visible wavelength (450-980 nm) cameras in the road segment. The VisibleCameraPosition field is one or more vectors specifying the mounting positions of the visible wavelength (450-980 nm) camera devices. The NIRCameraRange field is the average detection range of the short wavelength (980 nm-2000 nm) cameras in the road segment. The NIRCameraPosition field is one or more vectors specifying the mounting positions of the short wavelength (980 nm-2000 nm) camera devices. The ThermalCameraRange field is the average detection range of the thermal cameras in the road segment. The ThemalCameraPosition field is one or more vectors specifying the mounting positions of the thermal camera devices.

An exemplary UsedAutonomousFunctions 2412 message contains seven fields, which are listed below. The RoadSegmentID field is the identification code of the road segment. The IntersectionAssisstance field is the percentage of the route segment length that supports the use of the intersection assistance function. The LaneKeeping field is the percentage of the route segment length that supports the use the lane keeping function. The TrafficJamAssistant field is the percentage of the route segment length that supports the traffic jam assistant function. The HighwayPilot field is the percentage of the route segment length that supports the highway pilot function. The LaneChangeAssisstance field is the percentage of the route segment length that supports the lane change assistance function. The Platooning field is the percentage of the route segment length that supports the platooning function.

An exemplary RoadStatus 2414 message contains five fields, which are listed below. The RoadSegmentID field is the identification code of the road segment. The LaneMarkings field is the visibility level (0-100%) of the lane markings. The RoadWeather field is the weather conditions (ice, snow, rain/wet) detected by the vehicle. The RoadType field is the road type (asphalt, concrete, gravel, dirt) detected by the vehicle. The RoadWidth field is the width of the road in meters (or feet) per road segment. The RoadWidth field may change due to snow banks or road use.

An exemplary RouteSensorPerformance 2418 message contains fourteen fields, which are listed below. The RoadSegmentID field is the identification code of the road segment according to the map data. The ShortRangeRadar field is the average effective range of the 24 GHz radars in the road segment. The ShortRangeRadarPosition field is one or more vectors specifying the mounting positions of the short range radars. The LongRangeRadar field is the average effective range of the 77 GHz radars in the road segment. The LongRangeRadarPosition is one or more vectors specifying the mounting positions of the long range radars. The LIDARType field is the wavelength of the LIDAR sensor. The LIDARRange field is the average effective distance range of the LIDARs in the road segment. The LIDARPosition field is one or more vectors specifying the mounting positions of LIDAR laser scanners. The VisibleCameraRange field is the average detection range of the visible wavelength (450-980 nm) cameras in the road segment. The VisibleCameraPosition field is one or more vectors specifying the mounting positions of the visible wavelength (450-980 nm) camera devices. The NIRCameraRange field is the average detection range of the short wavelength (980 nm-2000 nm) cameras in the road segment. The NIRCameraPosition field is one or more vectors specifying the mounting positions of the short wavelength (980 nm-2000 nm) camera devices. The ThermalCameraRange field is the average detection range of the thermal cameras in the road segment. The ThemalCameraPosition field is one or more vectors specifying the mounting positions of the thermal camera devices.

An exemplary OtherVehiclesInRoute (or OtherCarsInRoute) 2420 messages contains the MAC_ID field, which is one or more MAC identification codes of other vehicles on the host vehicle's route.

An exemplary AutonomousFunctionsReport 2422 message contains six fields, which are listed below. The RoadSegmentID field is the identification code of the road segment. The IntersectionAssistance field is the percentage of the route segment length that supports use of the intersection assistance function. The LaneKeeping field is the percentage of the route segment length that supports use of the lane keeping function. The Stop&Go field is the percentage of the route segment length that supports use of the stop & go function. The HighwayAssistance field is the percentage of the route segment length that supports use of the highway assistance function. The OvertakingAssistance field is the percentage of the route segment length that supports use of the overtaking assistance function.

An exemplary InfraRouteStatus 2426 message contains five fields, which are listed below. The RoadSegmentID field is the identification code of the road segment. The LaneMarkings field is a Boolean (true/false) of whether or not lane markings are visible on the route segment. (In other embodiments, the LandMarkings field may convey a visibility level, e.g. a number between 0 and 100 that represents the percentage visibility of the lane markings.) The RoadWeatherStatus field is weather conditions (ice, snow, rain/wet) detected on the route segment. The RoadType field is the road type (asphalt, concrete, gravel, dirt) detected on the route segment. The RoadWidth field is the width of the road in meters (or feet). The RoadWidth field may change due to snow banks or road use.

An exemplary UsedAutonomousFunctions message 2430 reports the usage of AV functions mentioned above and described below. For the intersection assistance function, vehicles communicate directions/destinations, speed, and position. Vehicles are fully controlled at intersection areas, creating small "urban platoons" crossing the intersection where groups of vehicles traveling in the same direction cross the intersection together.

For the lane keeping function, the active lane keeping assistance system determines a recommendation for smooth steering. The driver's steering wheel control takes priority over the active lane keeping assistance system, but if no driver input is given, the system follows the lane automatically.

For the stop & go (traffic jam assistance) function, the system detects traffic jams when the host vehicle is travelling up to 60 km/hour (37 miles/hour). Upon activation of the traffic jam assistance function, the system detects slow driving vehicle in front and handles the vehicle both longitudinally and laterally.

The highway pilot (highway assistance) function controls longitudinal and lateral position of a host vehicle on highways (motorways) and other high speed roads. The function also controls the vehicle speed from 0 to 130 km/hour (80 miles/hour). The upper speed limit may be set higher for some embodiments.

For the lane change assistance (overtaking assistance) function, the system monitors areas to the left and right of a host vehicle, including blind spots, and up to 50 meters (164 feet) behind the vehicle and warns the driver of a potentially hazardous situations by flashing warning lights in exterior mirrors.

For the platooning function, automated (driverless) vehicles follow a lead vehicle. The function supports vehicle sharing. One lead vehicle may pick-up several follower vehicles.

See the ETSI standard TS 101 539-1, Intelligent Transport Systems (ITS), V2X Application, Part 1: Road Hazard Signaling (RHS) Application Requirements Specification, ETSI, TS 101 539-1 V1.1.1 (2013-08), for more details about the above automated functions of intersection assistance, lane keeping, traffic jam assistance, highway pilot, lane change assistance, and platooning. The standard specifies the protocol to deliver road hazard signals (e.g., weather-related signals) via C2X (channel to vehicles) communication.

For some embodiments, the systems and methods may maximize the use of automated functions and/or minimize the ecological foot-print for a route. A host vehicle may be configured to search for driving conditions, such as less congestion or no snow on the ground, while maximizing the use of automated functions and minimizing emissions (such as CO or $CO_2$) or fuel consumption.

A host vehicle may have only a LIDAR system available (which may have a range of about 200 m in front). Reliable LIDAR readings may not be available when dense fog occurs in front of the vehicle. This condition may cause the vehicle to switch from automated to manual driving mode or to limit the maximum automated driving speed to 20 to 30 km/hour (12 to 18 miles/hour). A system may determine for safety reasons to recommend that vehicles with only LIDAR systems not take the route segment. For similar LIDAR-only vehicles, an ITS weather service may communicate alternative routes with clear visibility, even if such routes are longer.

An autonomous vehicle with only a 3D camera may select a route with a gravel road in a dark forest. Readings may be unreliable due to limited visibility. The vehicle may send a message indicating the situation to a cloud server. A second vehicle with short range radar and a night vision system (such as a thermal camera) may send to an ITS backend system a query message regarding radar performance on a route segment. Because the second vehicle has both a radar system that may be able to detect objects up to 30 m away and a night vision system with a thermal camera, the second vehicle may make a determination to take the shorter and non-congested road even though the road is made of gravel and goes through a dark forest.

In an exemplary embodiment, sensor system performance in AVs is forecast. A performance estimation model may be implemented by roadside weather stations to provide forecasts to backend systems via wireless communication channels. Autonomous vehicle performance may be accurately forecast along a planned route. Exemplary systems may also measure or calculate information for traffic management, such as data for predicting impact to the traffic flow. For some embodiments, such data may be communicated if the speed of autonomous vehicles is restricted due to bad weather conditions. For evaluating actual performance of vehicle sensors, measurements are made of visibility (range degradation) over the frequencies or wavelengths used by sensors in autonomous vehicles (or cars for some embodiments). The sensors evaluated are not limited to radars, LIDARs and cameras.

Exemplary embodiments use degradation factors to forecast performance. These factors may include the influence of weather conditions on sensor signal attenuation for different wavelengths and frequency bands. Another factor is attenuation of sensor performance due to dirt, snow, or water droplets in the area cover by the sensor.

Roadside measurement systems may be operated to measure the following weather conditions: the presence and intensity of the fog/mist, rain density and droplet size, the presence of hoarfrost, the presence of supercool rain, and the presence and density of snow fall. Droplet size distribution may be estimated using models and rain density (mm/h). In addition, roadside measurement systems use sensor setups configured for frequencies (or wavelengths) that correlate with ranges used by autonomous vehicles.

Figure 22:
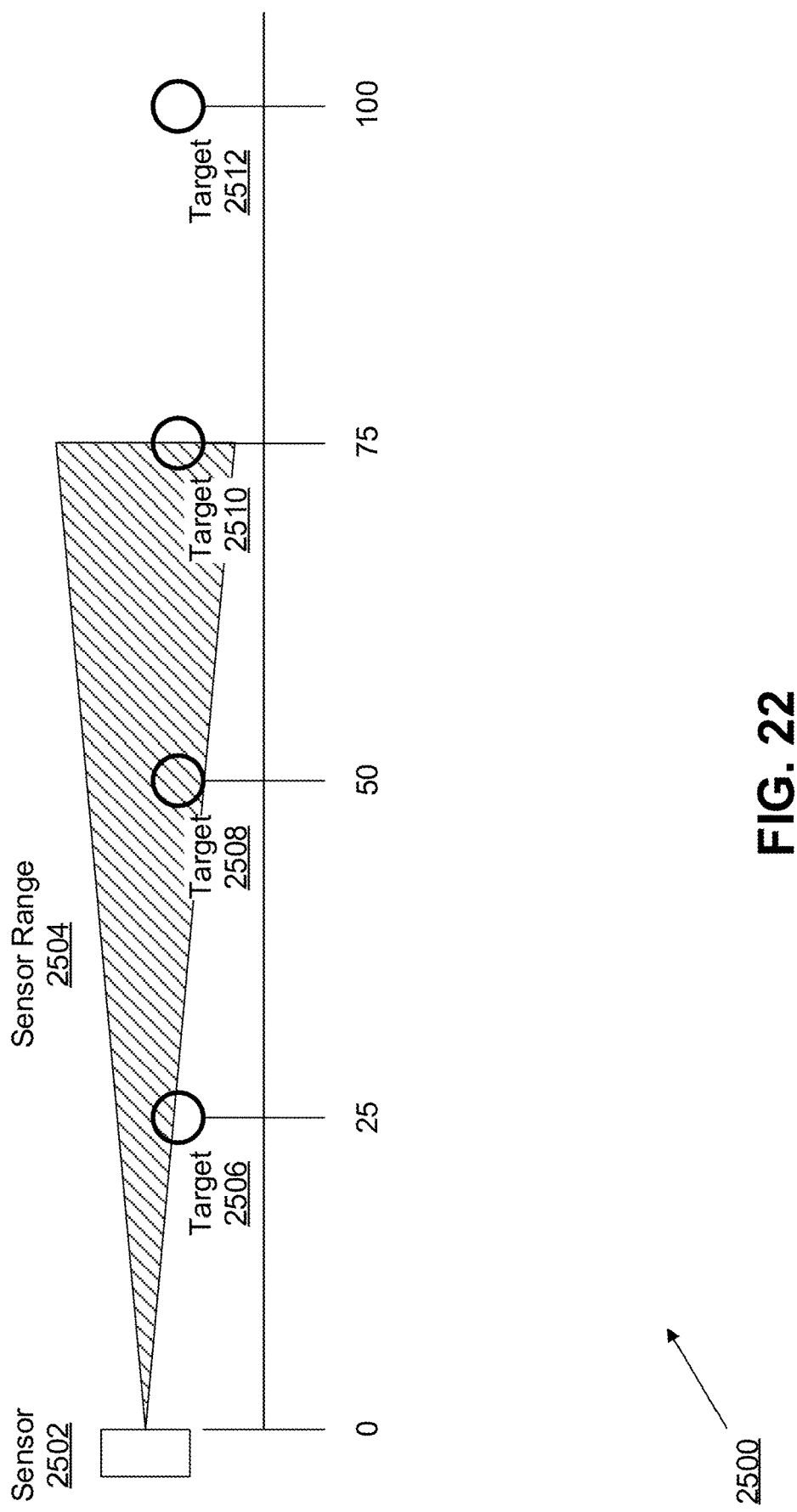
FIG. 22 is a schematic view illustrating measurement of sensor performance using targets at pre-defined distances.

FIG. 22 is a plan view schematic 2500 for measurement of sensor performance using targets at pre-defined distances. A measurement setup includes reference sensors 2502 and targets 2506, 2508, 2510, 2512 that are located at pre-determined distances from the sensor being evaluated. Sensor performance (which may include a sensor's range 2504) may be measured and compared to a normalized reference.

One embodiment uses a set of sensors that measure in real time the range achieved by a sensor, as shown in FIG. 22. For some embodiments, a system may be tied to a certain set of sensors, and the embodiment may provide only current data.

Figure 23:
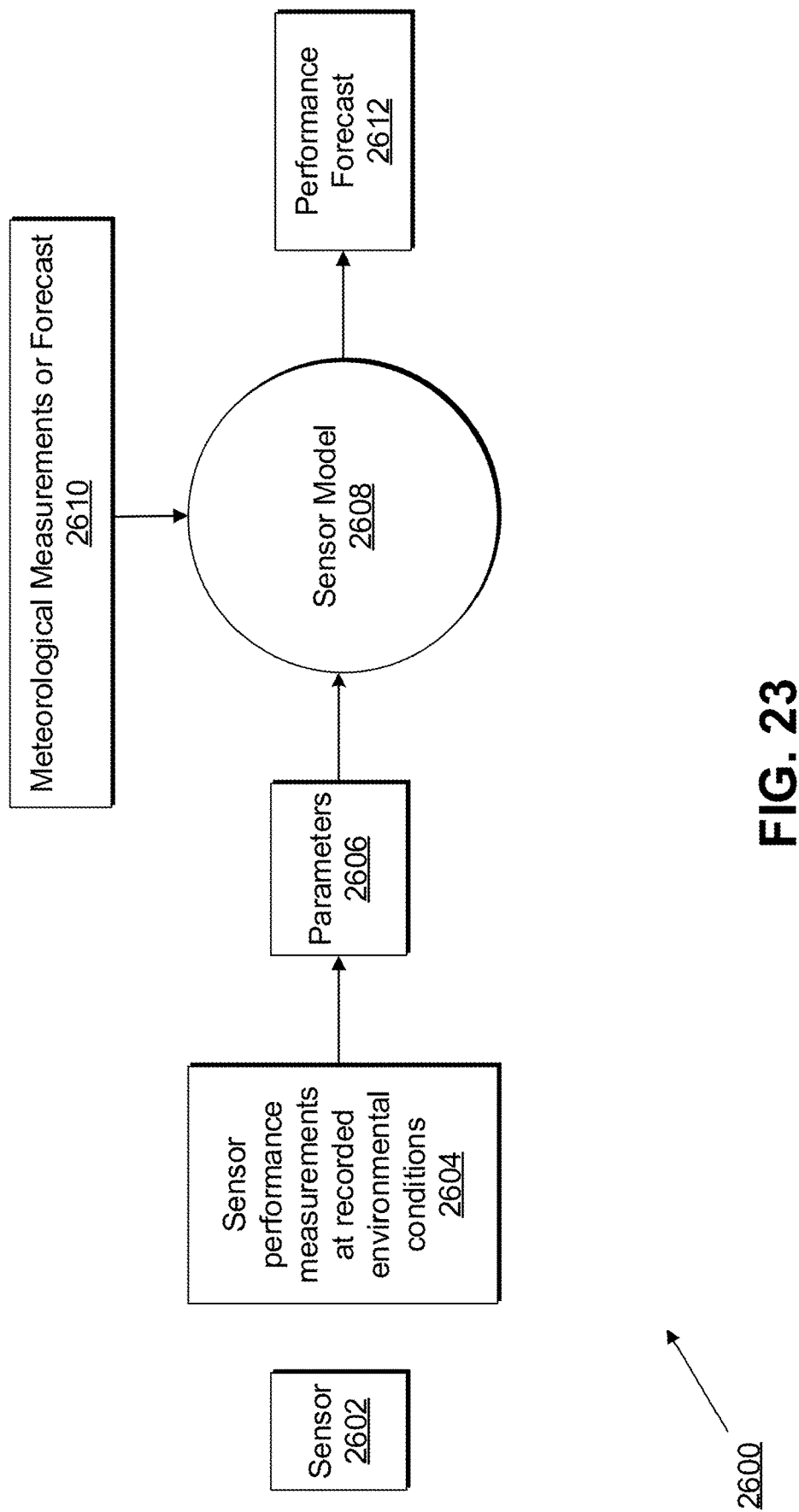
FIG. 23 is a block diagram of a system used to model and predict sensor performance.

FIG. 23 is a block diagram 2600 of a system used to model and predict sensor performance. One embodiment uses a prediction model of signal degradation. Using meteorological data (for example, droplets size and density) 2604, a system may estimate performance of a typical sensor 2602 at current or forecasted weather conditions 2610. If forecasting sensor performance, a system may use sensor models 2608 instead of real measurements because measurements may not be made in advance.

Sensor performance data 2604 may be used to calculate accurate sensor model parameters 2606. Such sensor performance data 2604 may originate with data provided by sensor manufacturers. Also, sensor performance 2612 may be measured for different weather conditions in laboratory environments. Dedicated weather measurement chambers may be used to simulate accurate rain and fog conditions that are used in measuring sensor performance data under such conditions.

The sensor evaluation approach shown in FIG. 23 uses sensor models 2608. One embodiment uses individual sensor models (such as for manufacturers Ibeo, Sick, Velodyne, Bosch, or Continental, to name a few) 2608. Another embodiment uses more generic wavelength/frequency range models. A system may create a model by measuring parameters 2606 in a controlled environment. In such a controlled environment, fog or rain density, for example, may be adjusted freely. Meteorological measurements or forecasts 2610 are used by a sensor model 2608 to predict performance 2612 for individual sensors 2602 or to calculate a performance prediction table. A performance prediction table may list values over a wider wavelength/frequency range than performance predictions for an individual sensor.

Figure 24:
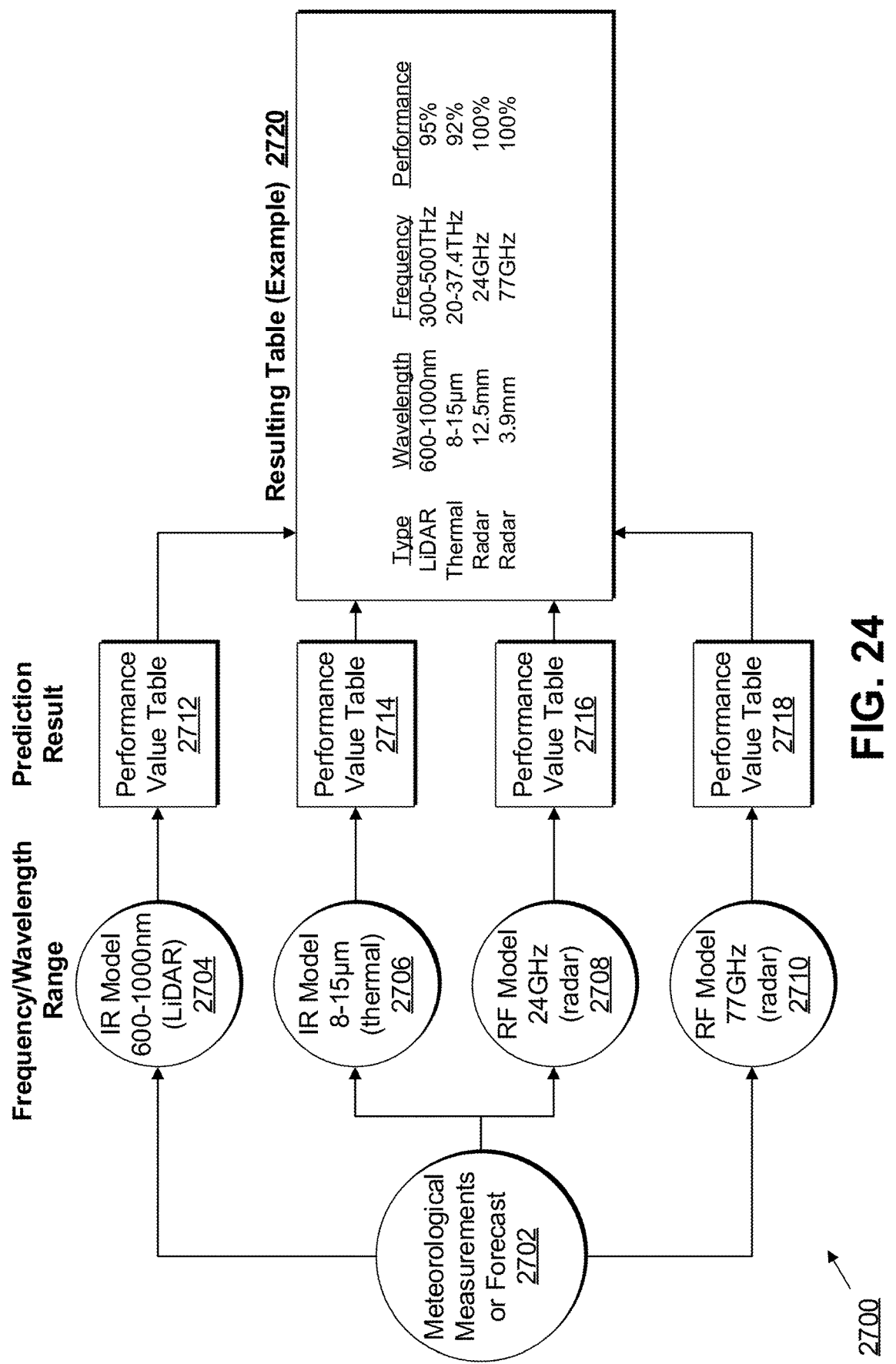
FIG. 24 is a block diagram for analysis of sensor performance at different wavelengths.

FIG. 24 is a block diagram 2700 for analysis of sensor performance at different wavelengths. LIDAR systems typically operate with a wavelength of 890 nm or 920 nm (2704). Thermal cameras typically operate in an 8 μm to 15 μm wavelength range 2706. Radar may operate at a frequency of 24 GHz (2708) or 77 GHz (2010). Sensor performance data from radars and optical sensors in different weather conditions are available from sensor manufacturers. Meteorological measurements or weather forecasts 2702 are used to create sensor reading performance predictions as performance values or tables 2712, 2714, 2716, 2718, depending on sensor type. Actual sensor readings are taken and compared with the predictions. A performance percentage may be calculated per sensor type in some embodiments. For LIDAR, performance may be measured based on effective LIDAR distance readings, while for RADAR, performance may be measured based on effective RADAR range.

As shown on the left side of FIG. 24, an exemplary system creates a sensor performance forecast 2720, by taking measurements from sensors (such as radar systems or optical spectral receivers) or by reading data from public meteorological weather service providers. The exemplary system calculates signal attenuation for control (or ideal) conditions (such as clear sky, no rain, and no fog) and estimates sensor performance in an area covered by a measurement station. Comparing actual readings to estimated readings, the system calculates performance degradation and sends a performance degradation lookup table 2720 to a backend IT system. For one embodiment, a degradation factor may be calculated to estimate sensor performance while traversing a route segment.

Figure 25:
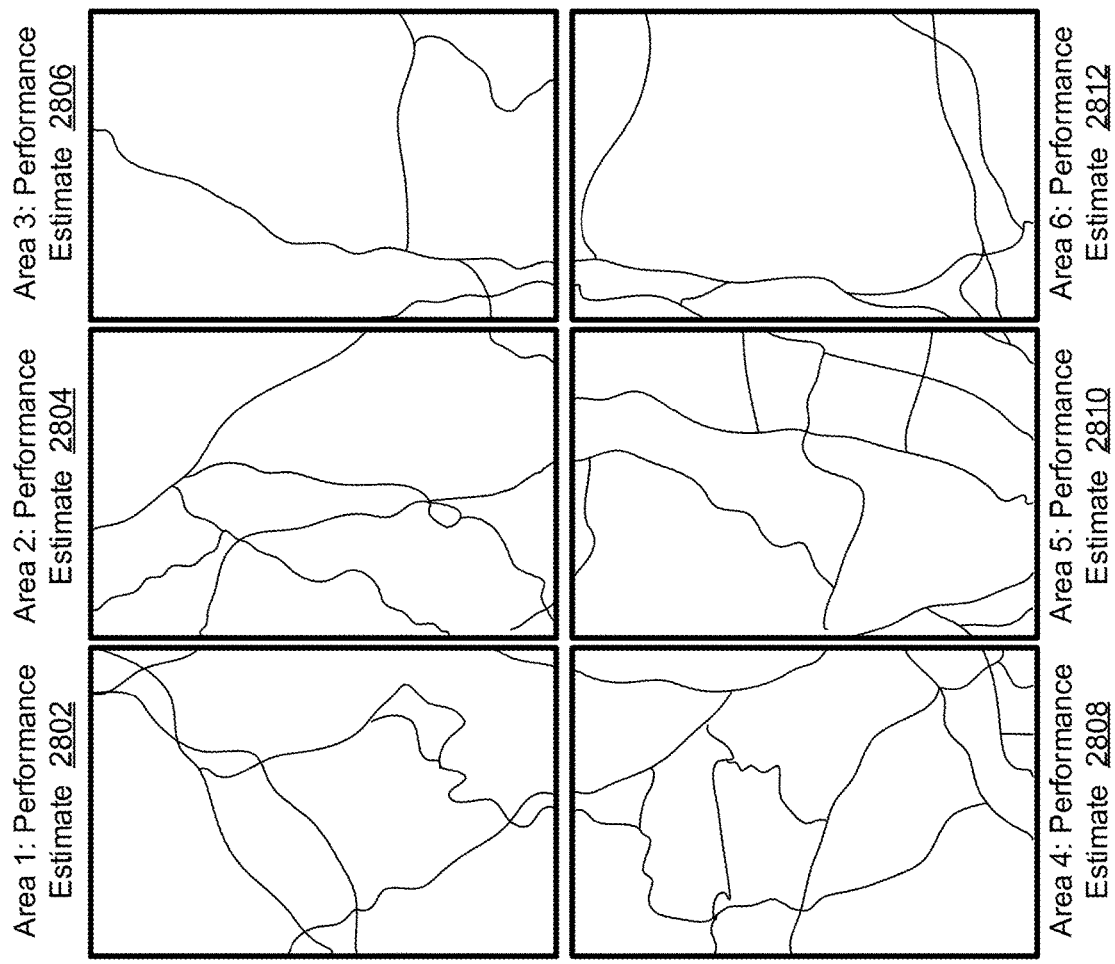
FIG. 25 is a map with regional assignments for sensor performance estimates.

FIG. 25 is a map 2800 with regional assignments 2802, 2804, 2806, 2808, 2810, 2812 for sensor performance estimates. An AV may use data calculated for a particular region to modify sensor readings used in calculating routing. Sensor performance estimates may be calculated for certain areas or grids. Various applications may use this information, such as an AV prior to making a trip, an AV while on a route, an AV when re-routing, or road authorities predicting traffic flow. In harsh weather conditions, an AV may drive slower because of a degradation in environment perception system performance (such as perception range). Slower vehicle speeds have a negative effect on road throughput and may cause traffic jams and other disturbances. Difficult driving conditions may affect travel time. As a counter measure, travel time may be optimized by route planning algorithms.

For some embodiments, AV sensor performance for route segments may be communicated to a roadside unit. A roadside unit may store AV sensor performance based on location and weather conditions. A roadside unit may also calculate regional sensor performance models based on stored AV sensor performance and weather conditions. For some embodiments, a roadside unit may measure weather conditions (or receive weather information from a weather service), measure AV sensor performance degradation, estimate AV sensor performance degradation in weather conditions, and store weather conditions, actual AV sensor performance degradation, and estimated AV sensor performance degradation on a regional basis. A roadside unit may also have circuitry for connecting to wireless communication infrastructure, and circuitry for making short-range wireless communications with vehicles.

During setup and calibration, the system may be adjusted on days with ideal weather conditions. Ideal weather conditions are days with no fog, rain, or snow in the atmosphere and may be different than actual weather conditions present during system use.

Figure 26:
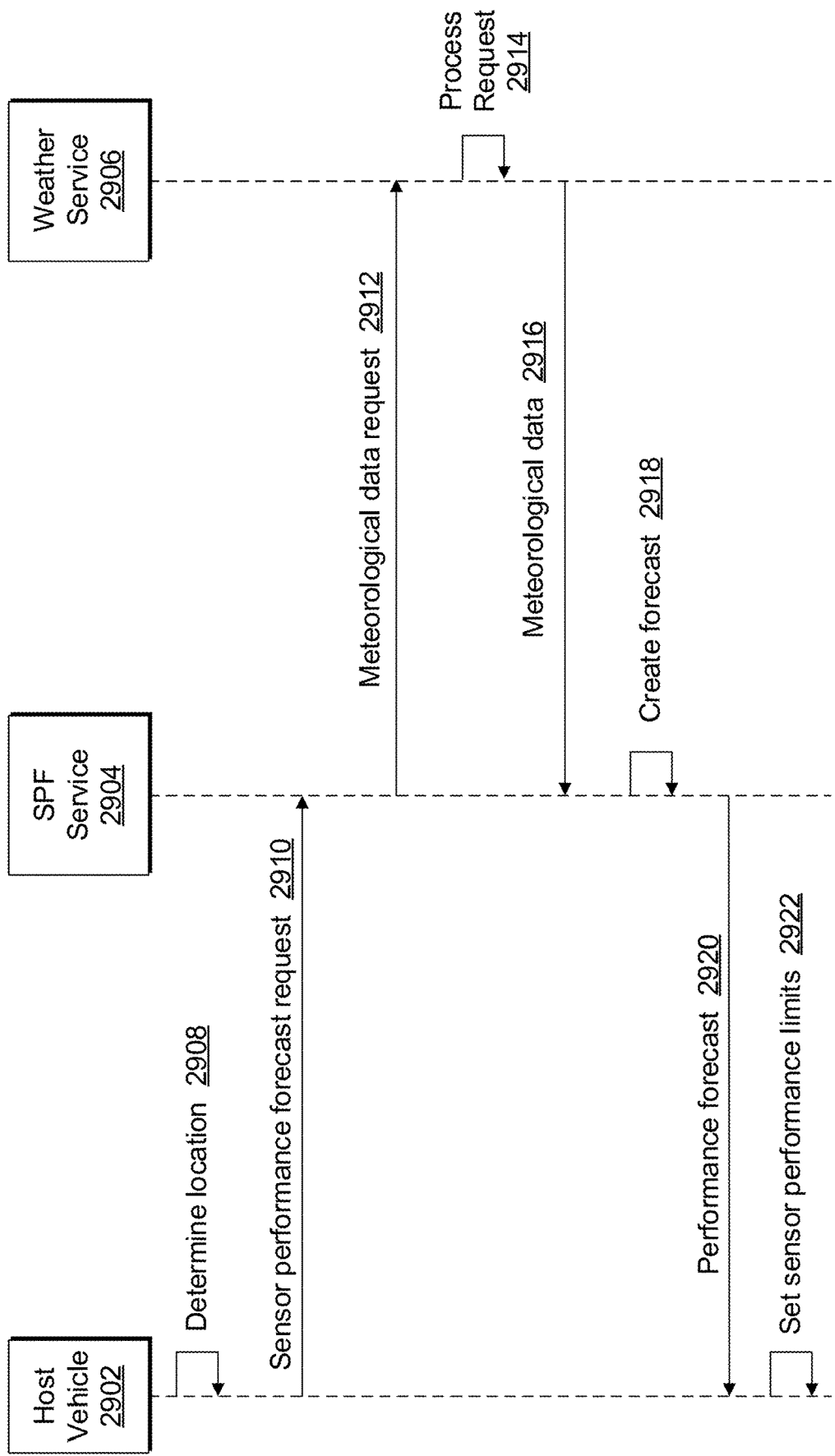
FIG. 26 is a message sequence diagram for interactions between a vehicle and a weather service.

FIG. 26 is a message sequence diagram 2900 for exemplary interactions among a vehicle 2902, a sensor performance forecast (SPF) service 2904, and a weather service 2906. FIG. 26 shows the messages sent for an AV 2902 to receive a performance forecast 2920. A host vehicle 2902 determines a location 2908 and time period for a sensor performance forecast. The location may be either at current location of the vehicle or at planned route locations. The time period may be the current time or a future time, such as tomorrow at 5 PM. The host vehicle 2902 sends a sensor performance forecast (SPF) request 2910 to an SPF backend service 2904. The SPF service 2904 sends a meteorological data request 2912 to a weather service 2906. The weather service 2904 processes the request 2914 and responds with meteorological data (a weather forecast) 2916. The SPF service 2906 calculates a performance forecast (or performance prediction) 2918 based on the weather forecast and sends a performance forecast message 2920 to a host vehicle 2902. The host vehicle 2902 uses the received performance forecast 2920 to set sensor performance limits 2922. Sensor performance limits are used to estimate vehicle performance, to set bounds within which to operate sensors, and to calculate risk (or safety) of autonomous operation.

An exemplary sensor performance forecast request message contains four fields, which are described below. The location field contains latitude and longitude coordinates. The time period field is the time to use for calculating the forecast. The time is stored in 24-hour format for Greenwich Mean Time (GMT). The generic/specific field is a Boolean flag (true/false). A value of "true" means the sensor performance forecast request is for the specific sensors used by the AV, and a value of "false" means the request is for generic forecasts for the same class of sensors used by the AV. The fourth field contains a vehicle year, make, and model; a sensor model; or a frequency range to use for the request. The SPF service converts the vehicle year, make, and model to a list of sensor types and models. The SPF service converts the sensor model to a frequency or wavelength range.

An exemplary sensor performance forecast response message contains five fields, which are described below. The location field contains latitude and longitude coordinates. The forecast timestamp is the time the forecast was calculated. The time is stored in 24-hour format for GMT. The time period when valid field is the expiration time of the forecast. Again, the time is stored in 24-hour format for GMT. The generic/specific field is a Boolean flag (true/false). A value of "true" means the sensor performance forecast request is for the specific sensors used by the AV, and a value of "false" means the request is for generic forecasts for the same class of sensors used by the AV. If the list of performance forecasts is sent for generic wavelength/frequency bands, the generic/specific flag is false. If the list of performance forecasts is sent for a specific sensor model, the generic/specific flag is true.

Satellite positioning performance degradation may be measured. Satellite positioning data becomes degraded in bad weather conditions due to signal attenuation. For some embodiments, GNSS performance data may be added to sensor performance estimations.

Snow may cover sensors used to make measurements of the environment around a vehicle. Sensors may make faulty measurements because of snow. New falling snow may also cover environment measurement sensors. This condition may degrade performance of vehicle positioning measurements that are based on 3D models of the environment.

Sensor specific range degradation estimations may be calculated. A sensor model is developed using particular sensors, and one sensor may be used to calculate estimates for that sensor.

In an exemplary use case, a road authority sends a performance forecast request to a meteorological institute server. The response to the request shows that after 5 AM, there is expected to be a large drop in AV perception sensor performance. The drop is expected to last until 9 AM. To avoid morning traffic jams, the road authority prohibits the use of autonomous mode between 5 AM to 9 AM in the area.

In another exemplary use case, a family starts a holiday trip up north. The family sets the destination for the AV navigator. The navigator sends a request for sensor performance data to a meteorological institute server. The navigator receives a response from the meteorological server. A map database sever uses the meteorological data to calculate route weightings. The map database server also calculates a fastest route that maximizes automated driving.

Exemplary Architecture.

Embodiments disclosed herein may be implemented using the processor and other functionality of a WTRU (Wireless Transmitter Receiver Unit) connected to or implemented in an autonomous vehicle. A WTRU may be used to communicate with other vehicles, roadside units, ITS service units, road condition management service backend systems, weather data service backend systems, and other cloud server systems. A WTRU may also be used to implement the functionality as described above for roadside units, ITS service units, road condition management service backend systems, weather data service backend systems, and other cloud server systems.

Figure 27:
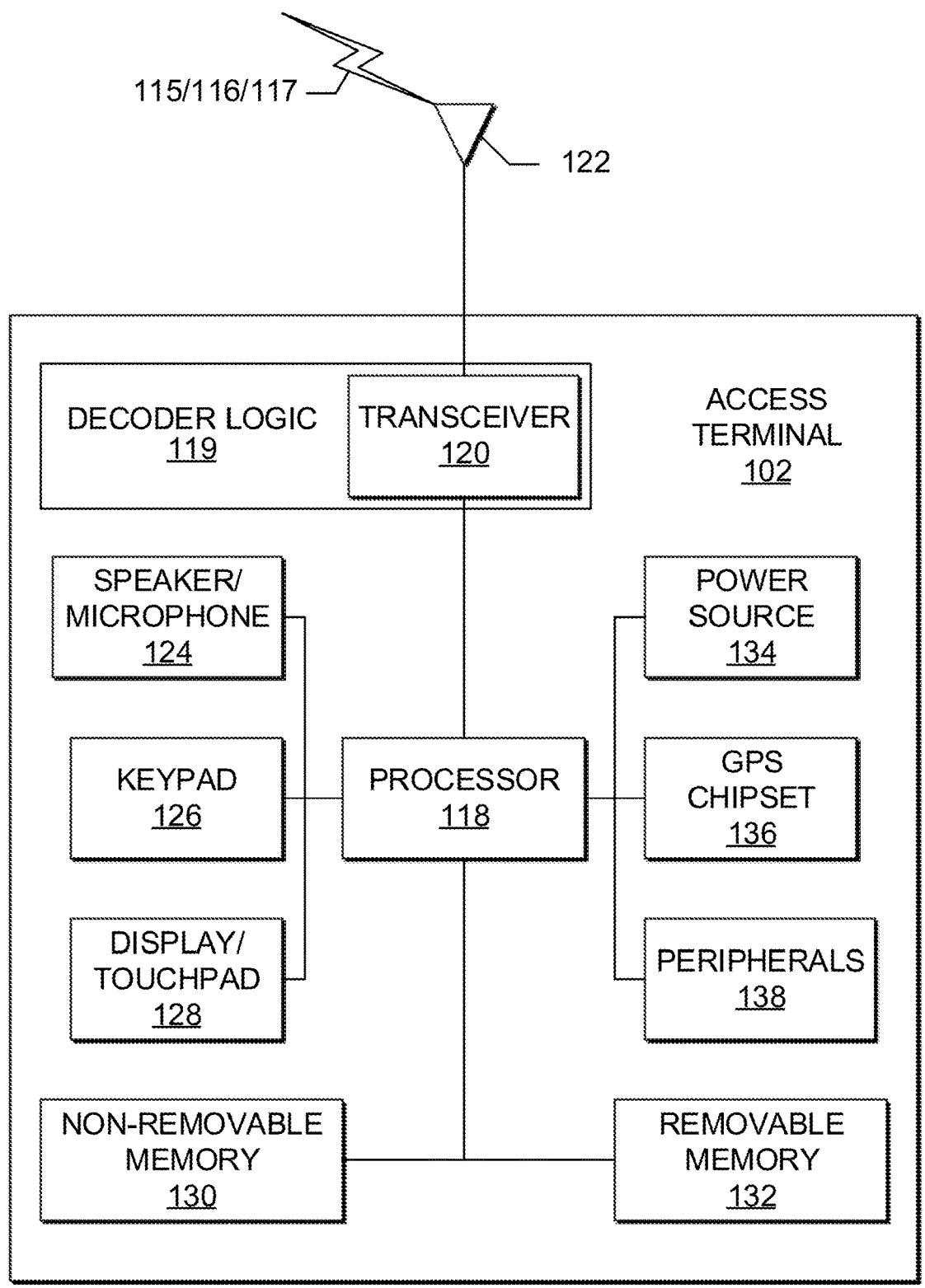
FIG. 27 depicts an example wireless transmit/receive unit (WTRU).

FIG. 27 is a system diagram of an example WTRU 102. As shown in FIG. 27, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 27 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of navigating an autonomous vehicle having at least a first type of environment perception sensor, the method comprising:
   receiving a plurality of sensor performance reports including a road segment identifier and sensor range data for the first type of environment perception sensor on the identified road segment;
   for each of a plurality of road segments, using the received sensor performance reports to determine at least a first average sensor range for the first type of sensor;
   selecting a route for the autonomous vehicle based at least in part on the first average sensor range for at least one road segment on the route; and
   causing the autonomous vehicle to follow the selected route.

2. The method of claim 1, wherein selecting a route comprises:
   identifying at least two alternate routes to a destination, wherein each route includes a plurality of road segments;
   selecting a route from among the alternate routes based at least in part on the first average sensor range for the road segments included in the alternate routes.

3. The method of claim 1, wherein causing the autonomous vehicle to follow the selected route comprises transmitting information identifying the selected route to the autonomous vehicle.

4. The method of claim 1, wherein causing the autonomous vehicle to follow the selected route comprises driving the autonomous vehicle along the selected route.

5. The method of claim 1, wherein the first type of environment perception sensor is a RADAR sensor.

6. The method of claim 1, wherein the first type of environment perception sensor is a LIDAR sensor.

7. The method of claim 1, wherein the sensor performance reports further comprise sensor range data of at least a second type of environment perception sensor on the identified road segment, the method further comprising:
for each of a plurality of road segments, using the received sensor performance reports to determine a second average sensor range for the second type of sensor;
wherein selection of the route is further based at least in part on the second average sensor range for at least one road segment on the route only if the autonomous vehicle has the second type of environment perception sensor.

8. The method of claim 1, further comprising receiving a plurality of autonomous function reports including a road segment identifier and information regarding the availability of at least one autonomous function on the identified road segment;
wherein selection of the route is further based at least in part on the availability of the at least one autonomous function for at least one road segment on the route.

9. The method of claim 8, wherein the autonomous function comprises a function selected from the group consisting of: intersection assistance, lane keeping, traffic jam assistance, highway pilot, and lane change assistance.

10. The method of claim 8, wherein the information regarding the availability of the autonomous function comprises a percentage of the identified road segment over which the autonomous function is available.

11. The method of claim 1, further comprising:
receiving information regarding weather conditions at a road segment; and
generating a prediction of expected sensor performance of at least the first type of environment perception sensor on the road segment;
wherein the selection of the route is based at least in part on the prediction of expected sensor performance.

12. The method of claim 1, further comprising:
receiving at least one report regarding presence of a rut at a lateral position on a road segment on the selected route;
wherein selection of the route comprises selecting a lane trajectory of the autonomous vehicle based at least in part on the lateral position of the rut.

13. The method of claim 1, further comprising:
receiving at least one report regarding disruption of an environment perception sensor at a lateral position on a road segment on the selected route;
wherein selection of the route comprises selecting a lane trajectory of the autonomous vehicle based at least in part on the lateral position associated with disruption of the environment perception sensor.

14. A system for navigating an autonomous vehicle having at least a first type of environment perception sensor, the system comprising at least one processor and a non-transitory computer-readable storage medium storing instructions operative when executed on the processor to perform functions comprising:
receiving a plurality of sensor performance reports including a road segment identifier and sensor range data of the first type of environment perception sensor on the identified road segment;
for each of a plurality of road segments, using the received sensor performance reports to determine at least a first average sensor range for the first type of sensor;
selecting a route for the autonomous vehicle based at least in part on the first average sensor range for at least one road segment on the route; and
causing the autonomous vehicle to follow the selected route.

15. The system of claim 14, wherein selecting a route comprises:
identifying at least two alternate routes to a destination, wherein each route includes a plurality of road segments;
selecting a route from among the alternate routes based at least in part on the first average sensor range for the road segments included in the alternate routes.

* * * * *